(12) United States Patent
He et al.

(10) Patent No.: US 10,897,629 B2
(45) Date of Patent: Jan. 19, 2021

(54) METHODS AND SYSTEMS FOR INTRA BLOCK COPY SEARCH ENHANCEMENT

(71) Applicant: Vid Scale, Inc., Wilmington, DE (US)

(72) Inventors: Yuwen He, San Diego, CA (US); Xiaoyu Xiu, San Diego, CA (US); Yan Ye, San Diego, CA (US); Ralph Neff, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 1061 days.

(21) Appl. No.: 14/743,662

(22) Filed: Jun. 18, 2015

(65) Prior Publication Data

US 2015/0373359 A1 Dec. 24, 2015

Related U.S. Application Data

(60) Provisional application No. 62/014,667, filed on Jun. 19, 2014.

(51) Int. Cl.
*H04N 19/513* (2014.01)
*H04N 19/186* (2014.01)
(Continued)

(52) U.S. Cl.
CPC ......... *H04N 19/513* (2014.11); *H04N 19/105* (2014.11); *H04N 19/147* (2014.11);
(Continued)

(58) Field of Classification Search
CPC .. H04N 19/176; H04N 19/105; H04N 19/186; H04N 19/182; H04N 19/97
See application file for complete search history.

(56) References Cited

U.S. PATENT DOCUMENTS 8,712,930 B1 * 4/2014 Covell ............... G06F 16/583
706/12
2009/0073319 A1 3/2009 Neuman
(Continued)

FOREIGN PATENT DOCUMENTS

CN 102668558 A 9/2012

OTHER PUBLICATIONS

T. Vermeir, "Use cases and requirements for lossless and screen content coding", JCTVC-M0172, Apr. 2013, Incheon, KR, Power Point Presentation.
(Continued)

*Primary Examiner* — Obafemi O Sosanya
(74) *Attorney, Agent, or Firm* — Invention Mine LLC

(57) ABSTRACT

In an intra-block copy video encoding method, an encoder performs a hash-based search to identify a selected set of candidate blocks for prediction of an input video block. For each of the candidate blocks in the selected set, the encoder determines a correlation between, on the one hand, luma and chroma components of the input video block and, on the other hand, luma and chroma components of the respective candidate blocks. A predictor block is selected based on the correlation and is used to encode the input video block. In different embodiments, the correlation may be the negative of the sum of absolute differences of the components, may include a Jaccard similarity measure between respective pixels, or may be based on a Hamming distance between two high precision hash values of the input video block and the candidate block.

20 Claims, 18 Drawing Sheets

(51) Int. Cl.

| | |
|---|---|
| *H04N 19/105* | (2014.01) |
| *H04N 19/176* | (2014.01) |
| *H04N 19/593* | (2014.01) |
| *H04N 19/463* | (2014.01) |
| *H04N 19/147* | (2014.01) |
| *H04N 19/90* | (2014.01) |
| *H04N 19/94* | (2014.01) |
| *H04N 19/70* | (2014.01) |

(52) U.S. Cl.
CPC ......... *H04N 19/176* (2014.11); *H04N 19/186* (2014.11); *H04N 19/463* (2014.11); *H04N 19/593* (2014.11); *H04N 19/70* (2014.11); *H04N 19/90* (2014.11); *H04N 19/94* (2014.11)

(56) References Cited

U.S. PATENT DOCUMENTS

| | | | |
|---|---|---|---|
| 2010/0284471 A1* | 11/2010 | Tsai ................... | H04N 19/132 375/240.24 |
| 2013/0022120 A1 | 1/2013 | Gupte | |
| 2013/0064289 A1 | 3/2013 | Chernyshev | |
| 2013/0322765 A1* | 12/2013 | Neumann ............... | G10L 25/57 382/197 |
| 2013/0336590 A1* | 12/2013 | Sentinelli ............. | G06F 16/739 382/218 |
| 2014/0044361 A1* | 2/2014 | Lee ....................... | G06K 9/481 382/201 |

OTHER PUBLICATIONS

P. Onno, G. Laroche, T. Poirier, C. Gisquet, "AhG5: On the displacement vector prediction scheme for Intra Block Copy", JCTVC-Q0062, Mar. 2014, Valencia, Power Point Presentation.
X. Zhang, K. Zhang, J. An, H. Huang, S. Lei, "Block vector prediction for intra block copy", JCTVC-Q0080, Mar. 27-Apr. 4, 2014, 17th JCT Meeting in Valencia, Power Point Presentation.
K. Zhang, J. An, X. Zhang, H. Huang, S. Lei, "Symmetric intra block copy", JCTVC-Q0082, Presented by Tzu-Der (Peter) Chuang, Mar. 27-Apr. 4, 2014, 17th JCT Meeting in Valencia, Power Point Presentation.
S.-T. Hsiang, T.-D. Chuang, S. Lei, "AHG8: Coding the prediction differences of the intra BC vectors", JCTVC-Q0095, Presented by Tzu-Der (Peter) Chuang, Mar. 27-Apr. 4, 2014, 17th JCT Meeting in Valencia, Power Point Presentation.
C. Pang, J. Sole, R. Joshi, M. Karczewicz, "Block vector prediction method for intra block copy", JCTVC-Q0114, Mar. 2014, Valencia.
C. Pang, J .Sole, T. Hsieh, M. Karczewicz, "Intra block copy with larger search region", JCTVC-Q0139, Mar. 2014, Valencia, Power Point Presentation.
ITU-T Q6/16 and ISO/IEC JCT1/SC29/WG11, "Joint Call for Proposals for Coding of Screen Content", MPEG2014/N14175, Jan. 2014, San Jose, USA.
J. Chen, Y. Chen, T. Hsieh, R. Joshi, M. Karczewicz, W.-S. Kim, X. Li, C. Pang, W. Pu, K. Rapaka, J. Sole, L. Zhang, F. Zou, "Description of screen content coding technology proposal by Qualcomm", JCTVC-Q0031, Mar. 2014, Valencia, ES, pp. 1-19.
C.-C. Chen, T.-S. Chang, R.-L. Liao, C.-W. Kuo, W.-H. Peng, H.-M. Hang, Y.-J. Chang, C.-H. Hung, C.-C. Lin, J.-S. Tu, E.-C. Ke, J.-Y. Kao, C.-L. Lin, F.-D. Jou, F.-C. Chen, "Description of screen content coding technology proposal by NCTU and ITRI International", JCTVC-Q0032, Mar. 2014, Valencia, ES, pp. 1-27.
P. Lai, T.-D. Chuang, Y.-C. Sun, X. Xu, J. Ye, S.-T. Hsiang, Y.-W. Chen, K. Zhang, X. Zhang, S. Liu, Y.-W. Huang, S. Lei, "Description of screen content coding technology proposal by MediaTek", JCTVC-Q0033, Mar. 2014, Valencia, ES.
Z. Ma, W. Wang, M. Xu, X. Wang, H. Yu, "Description of screen content coding technology proposal by Huawei Technologies", JCTVC-Q0034, Mar. 2014, Valencia, ES, pp. 1-22.
B. Li, J. Xu, F. Wu, X. Guo, G. J. Sullivan, "Description of screen content coding technology proposal by Microsoft", JCTVC-Q0035, Mar. 2014, Valencia, ES, pp. 1-27.
R. Cohen, A. Minezawa, X. Zhang, K. Miyazawa, A. Vetro, S. Sekiguchi, K. Sugimoto, T. Murakami, "Description of screen content coding technology proposal by Mitsubishi Electric Corporation", JCTVC-Q0036, Mar. 2014, Valencia, ES.
X. Xiu, C.-M. Tsai, Y. He, Y. Ye, "Description of screen content coding technology proposal by InterDigital", JCTVC-Q0037, Mar. 2014, Valencia, ES, pp. 1-30.
T. Lin, S. Wang, P. Zhang, and K. Zhou, "AHG8: P2M based dual-coder extension of HEVC", Document No. JCTVC-L0303, Jan. 2013, pp. 1-5.
X. Guo, B. Li, J.-Z. Xu, Y Lu, S. Li, and F. Wu, "AHG8: Major-color-based screen content coding", Document No. JCTVC-O0182, Oct. 2013, pp. 1-33.
L. Guo, Karczewicz, J. Sole, and R. Joshi, "Evaluation of Palette Mode Coding on HM-12.0+RExt-4.1", JCTVC-O0218, Oct. 2013, pp. 1-7.
C. Pang, J. Sole, L. Guo, M. Karczewicz, and R. Joshi, "Non-RCE3: Intra Motion Compensation with 2-D MVs", JCTVC-N0256, Jul. 2013, pp. 1-12.
B. Bross, W-J. Han, G. J. Sullivan, J-R. Ohm, T. Wiegand, "High Efficiency Video Coding (HEVC) Text Specification Draft 10", JCTVC-L1003. Jan. 2013.
G.J. Sullivan and T. Wiegand, Rate-distortion optimization for video compression. IEEE Signal Processing Magazine, vol. 15, issue 6, Nov. 1998.
T. Vermeir, "Use cases and requirements for lossless and screen content coding", JCTVC-M0172, Apr. 2013, Incheon, KR, pp. 1-6.
J. Sole, R. Joshi, M. Karczewicz, "AhG8: Requirements for wireless display applications", JCTVC-M0315, Apr. 2013, Incheon, KR.
D. Flynn, M. Naccari, K. Sharman, C. Rosewarne, J. Sole, G. J. Sullivan, T. Suzuki, "HEVC Range Extension Draft 6", JCTVC-P1005, Jan. 2014, San Jose.
J. Sole, S. Liu,"HEVC Screen Content Coding Core Experiment 1 (SCCE1): Intra Block Copying Extensions", JCTVC-Q1121, Mar. 2014, Valencia.
C.-C. Chen, X. Xu, L. Zhang, "HEVC Screen Content Coding Core Experiment 2 (SCCE2): Line-based Intra Copy", JCTVC-Q1122, Mar. 2014, Valencia.
Y.-W. Huang, P. Onno, R. Joshi, R. Cohen, X. Xiu, Z. Ma, "Description of Screen Content Coding Core Experiment 3 (SCCE3): Palette mode", JCTVC-Q1123, Mar. 2014, Valencia.
Y. Chen, J. Xu, "HEVC Screen Content Coding Core Experiment 4 (SCCE4): String matching for sample coding", JCTVC-Q1124, Mar. 2014, Valencia.
X. Xiu, J. Chen, "HEVC Screen Content Coding Core Experiment 5 (SCCE5): Inter-component prediction and adaptive color transforms", JCTVC-Q1125, Mar. 2014, Valencia.
P. Onno, G. Laroche, T. Poirier, C. Gisquet, "AhG5: On the displacement vector prediction scheme for Intra Block Copy", JCTVC-Q0062, Mar. 2014, Valencia, pp. 1-6.
X. Zhang, K. Zhang, J. An, H. Huang, S. Lei, "Block vector prediction for intra block copy", JCTVC-Q0080, Mar. 2014, Valencia, pp. 1-7.
K. Zhang, J. An, X. Zhang, H. Huang, S. Lei, "Symmetric intra block copy", JCTVC-Q0082, Mar. 2014, Valencia, pp. 1-11.
S.-T. Hsiang, T.-D. Chuang, S. Lei, "AHG8: Coding the prediction differences of the intra BC vectors", JCTVC-Q0095, Mar. 2014, Valencia, pp. 1-4, attachment; JCTVC_Q0095_TextSpecification. doc, attachment; JCTVC_Q0095_TextSpecification_r1.doc.
C. Pang, J. Sole, R. Joshi, M. Karczewicz, "Block vector prediction method for intra block copy", JCTVC-Q0114, Mar. 2014, Valencia, pp. 1-3.
L. Zhu, J. Xu, G. J. Sullivan, Y. Wu, S. Sankuratri, B.A.Kumar, "Ping-pong block vector predictor for intra block copy", JCTVC-Q0134, Mar. 2014, Valencia.
B. Li, J. Xu, "Hash-based intraBC search", JCTVC-Q0252, Mar. 2014, Valencia.
C. Pang, J .Sole, T. Hsieh, M. Karczewicz, "Intra block copy with larger search region", JCTVC-Q0139, Mar. 2014, Valencia, pp. 1-6.

(56) References Cited

OTHER PUBLICATIONS

R. Joshi, J. Xu, R. Cohen, S. Liu, Z. Ma, Y. Ye, "Screen content coding test model 1 (SCM 1)", JCTVC-Q1014, Mar. 2014, Valencia.
C. Pang, J. Sole, M. Karczewicz, "Intra block copy with encoder search using chroma component", JCTVC-Q0175, Mar. 2014, Valencia, ES, pp. 1-3.
Hamming distance, http://en.wikipedia.org/wiki/Hamming_distance.
Cyclic redundancy check, http://en.wikipedia.org/wiki/Cyclic_redundancy_check.
C. Pang, J. Sole, L. Guo, M. Karczewicz, and R. Joshi, "Non-RCE3: Intra Motion Compensation with 2-D MVs", JCTVC-N0256, Power Point Presentation.
International Search Report and Written Opinion dated Aug. 20, 2015 for PCT/US2015/036475.
Li B et al: "Hash-based motion search", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,No. JCTVC-Q0245, Apr. 1, 2014 (Apr. 1, 2014), XP030116210, par. [0002].
Yu-Gang Jiang et al: "Query-Adaptive Image Search With Hash Codes", IEEE Transactions on Multimedia, IEEE Service Center, Piscataway, NJ, US, vol. 15, No. 2, Feb. 1, 2013 (Feb. 1, 2013), pp. 442-453, XP011487703, ISSN: 1520-9210, DOI: 10.1109/TMM.2012.2231061 the whole document.
Zhu Weijia et al: "2-D Dictionary Based Video Coding for Screen Contents", Data Compression Conference. Proceedings, IEEE Computer Society, Piscataway, NJ, US, Mar. 26, 2014 (Mar. 26, 2014), pp. 43-52, XP032600508, ISSN: 1068-0314, DOI: 10.1109/DCC.2014.11 [retrieved on Jun. 2, 2014] par. [03.1]-par. [03.4].
C. Pang, J. Sole, M. Karczewicz, "Intra block copy with encoder search using chroma component", JCTVC-Q0175, Mar. 2014, Valencia, ES, Power Point Presentation.
J. Chen, Y. Chen, T. Hsieh, R. Joshi, M. Karczewicz, W.-S. Kim, X. Li, C. Pang, W. Pu, K. Rapaka, J. Sole, L. Zhang, F. Zou, "Description of screen content coding technology proposal by Qualcomm", JCTVC-Q0031, Mar. 2014, Valencia, ES, Power Point Presentation.
P. Lai, T.-D. Chuang, Y.-C. Sun, X. Xu, J. Ye, S.-T. Hsiang, Y.-W. Chen, K. Zhang, X. Zhang, S. Liu, Y.-W. Huang, S. Lei, "Description of screen content coding technology proposal by MediaTek", Power Point Presentation, Presented by PoLin Lai, 17th JCT Meeting in Valencia, Mar. 27-Apr. 4, 2014.
C.-C. Chen, T.-S. Chang, R.-L. Liao, C.-W. Kuo, W.-H. Peng, H.-M. Hang, Y.-J. Chang, C.-H. Hung, C.-C. Lin, J.-S. Tu, E.-C. Ke, J.-Y. Kao, C.-L. Lin, F.-D. Jou, F.-C. Chen, "Description of screen content coding technology proposal by NCTU and ITRI International", JCTVC-O0032, Mar. 2014, Valencia, ES, Power Point Presentation.
Z. Ma, W. Wang, M. Xu, X. Wang, H. Yu, "Description of screen content coding technology proposal by Huawei Technologies", JCTVC-Q0034, Mar. 2014, Valencia, ES, Power Point Presentation.
B. Li, J. Xu, F. Wu, X. Guo, G. J. Sullivan, "Description of screen content coding technology proposal by Microsoft", JCTVC-Q0035, Mar. 2014, Valencia, ES, Power Point Presentation.
R. Cohen, A. Minezawa, X. Zhang, K. Miyazawa, A. Vetro, S. Sekiguchi, K. Sugimoto, T. Murakami, "Description of screen content coding technology proposal by Mitsubishi Electric Corporation", JCTVC-Q0036, Mar. 2014, Valencia, ES, Power Point Presentation.
X. Xiu, C.-M. Tsai, Y. He, Y. Ye, "Description of screen content coding technology proposal by InterDigital", JCTVC-Q0037, Mar. 2014, Valencia, ES, Power Point Presentation.
T. Lin, S. Wang, P. Zhang, and K. Zhou, "AHG8: P2M based dual-coder extension of HEVC", Document No. JCTVC-L0303, Jan. 2013, Power Point Presentation.
X. Guo, B. Li, J.-Z. Xu, Y. Lu, S. Li, and F. Wu, "AHG8: Major-color-based screen content coding", Document No. JCTVC-O0182, Oct. 2013, Power Point Presentation.
L. Guo, M. Karczewicz, J. Sole, and R. Joshi, "Evaluation of Palette Mode Coding on HM-12.0+RExt-4.1", JCTVC-O0218, Oct. 2013, Power Point Presentation.

\* cited by examiner

Coded Block    Uncoded Block

US 10,897,629 B2

METHODS AND SYSTEMS FOR INTRA BLOCK COPY SEARCH ENHANCEMENT

CROSS-REFERENCE TO RELATED APPLICATIONS

The present application is a non-provisional filing of, and claims benefit under 35 U.S.C. § 119(e) from, U.S. Provisional Patent Application Ser. No. 62/014,667, filed Jun. 19, 2014. The contents of that application are incorporated herein by reference in its entirety.

BACKGROUND

Over the past two decades, various digital video compression technologies have been developed and standardized to enable efficient digital video communication, distribution and consumption. Most of the commercially widely deployed standards are developed by ISO/IEC and ITU-T, such as H.261, MPEG-1, MPEG-2 H.263, MPEG-4 (part-2), and H.264/AVC (MPEG-4 part 10 Advance Video Coding). Due to the emergence and maturity of new advanced video compression technologies, a new video coding standard, High Efficiency Video Coding (HEVC), under joint development by ITU-T Video Coding Experts Group (VCEG) and ISO/IEC MPEG. HEVC (ITU-T H.265/ISO/IEC 23008-2) was approved as an international standard in early 2013, and is able to achieve substantially higher coding efficiency than the current state-of-the-art H.264/AVC.

Screen content sharing applications have become more and more popular in recent years with the proliferation of remote desktop, video conferencing and mobile media presentation applications. A two-way screen content sharing system may include a host sub-system including a capturer, encoder and transmitter, and a client sub-system including a receiver, decoder and display (renderer). There are various application requirements from industries for screen content coding (SCC). As compared to natural video content, screen content often contains numerous blocks with several major colors and strong edges because of sharp curves and text that frequently appears in screen content. Although existing video compression methods can be used to encode screen content and then transmit that content to the receiver side, most existing methods does not accommodate the characteristics of screen content and thus lead to a low compression performance. The reconstruction of screen content using conventional video coding technologies often leads to serious quality issues. For example, the curves and texts are blurred and can be difficult to recognize. Therefore, a well-designed screen-content compression method is desirable for effectively reconstructing screen content.

SUMMARY

Systems and methods are described herein for use in intra-block copy search. In an exemplary method performed by a video encoder, the encoder determines a hash value H for an input video block. The encoder then identifies a first set of candidate blocks by identifying candidate blocks that have respective hash values equal to the hash value of the input video block. From the candidate blocks in the first set, the encoder selects a second set of candidate blocks. The selection of the second set of candidate blocks is based on comparison of the luma components of the input video block with luma components of the respective candidate blocks. For each of the candidate blocks in the second set, the encoder determines a correlation between, on the one hand, luma and chroma components of the input video block and, on the other hand, luma and chroma components of the respective candidate blocks in the second set. The encoder selects a predictor block as, for example, the block in the second set having the highest correlation with the input video block. The encoder then encodes the input video block using the selected predictor block for prediction of the input video block.

BRIEF DESCRIPTION OF THE DRAWINGS

A more detailed understanding may be had from the following description, presented by way of example in conjunction with the accompanying drawings, which are first briefly described below.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Figure 1:
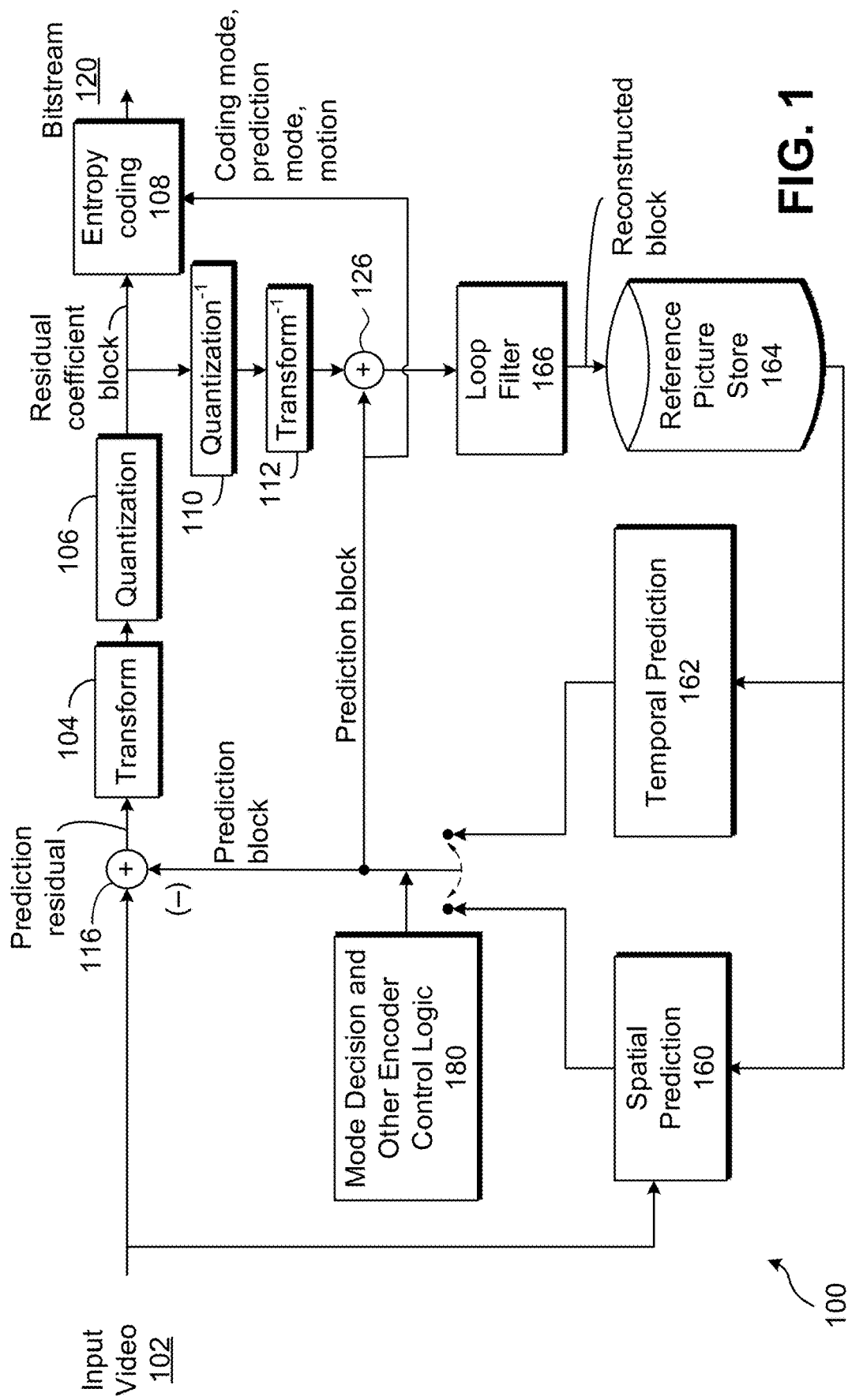
FIG. 1 is a block diagram illustrating an example of a block-based video encoder.

FIG. 1 is a block diagram illustrating an example of a block-based video encoder, for example, a hybrid video encoding system. The video encoder 100 may receive an input video signal 102. The input video signal 102 may be processed block by block. A video block may be of any size.

For example, the video block unit may include 16×16 pixels. A video block unit of 16×16 pixels may be referred to as a macroblock (MB). In High Efficiency Video Coding (HEVC), extended block sizes (e.g., which may be referred to as a coding tree unit (CTU) or a coding unit (CU), two terms which are equivalent for purposes of this disclosure) may be used to efficiently compress high-resolution (e.g., 1080p and beyond) video signals. In HEVC, a CU may be up to 64×64 pixels. A CU may be partitioned into prediction units (PUs), for which separate prediction methods may be applied.

For an input video block (e.g., an MB or a CU), spatial prediction 160 and/or temporal prediction 162 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for a video block, its reference picture index may be sent. The reference picture index may be used to identify from which reference picture in a reference picture store 164 the temporal prediction signal comes.

The mode decision block 180 in the encoder may select a prediction mode, for example, after spatial and/or temporal prediction. The prediction block may be subtracted from the current video block at 116. The prediction residual may be transformed 104 and/or quantized 106. The quantized residual coefficients may be inverse quantized 110 and/or inverse transformed 112 to form the reconstructed residual, which may be added back to the prediction block 126 to form the reconstructed video block.

In-loop filtering (e.g., a deblocking filter, a sample adaptive offset, an adaptive loop filter, and/or the like) may be applied 166 to the reconstructed video block before it is put in the reference picture store 164 and/or used to code future video blocks. The video encoder 100 may output an output video stream 120. To form the output video bitstream 120, a coding mode (e.g., inter prediction mode or intra prediction mode), prediction mode information, motion information, and/or quantized residual coefficients may be sent to the entropy coding unit 108 to be compressed and/or packed to form the bitstream. The reference picture store 164 may be referred to as a decoded picture buffer (DPB).

Figure 2:
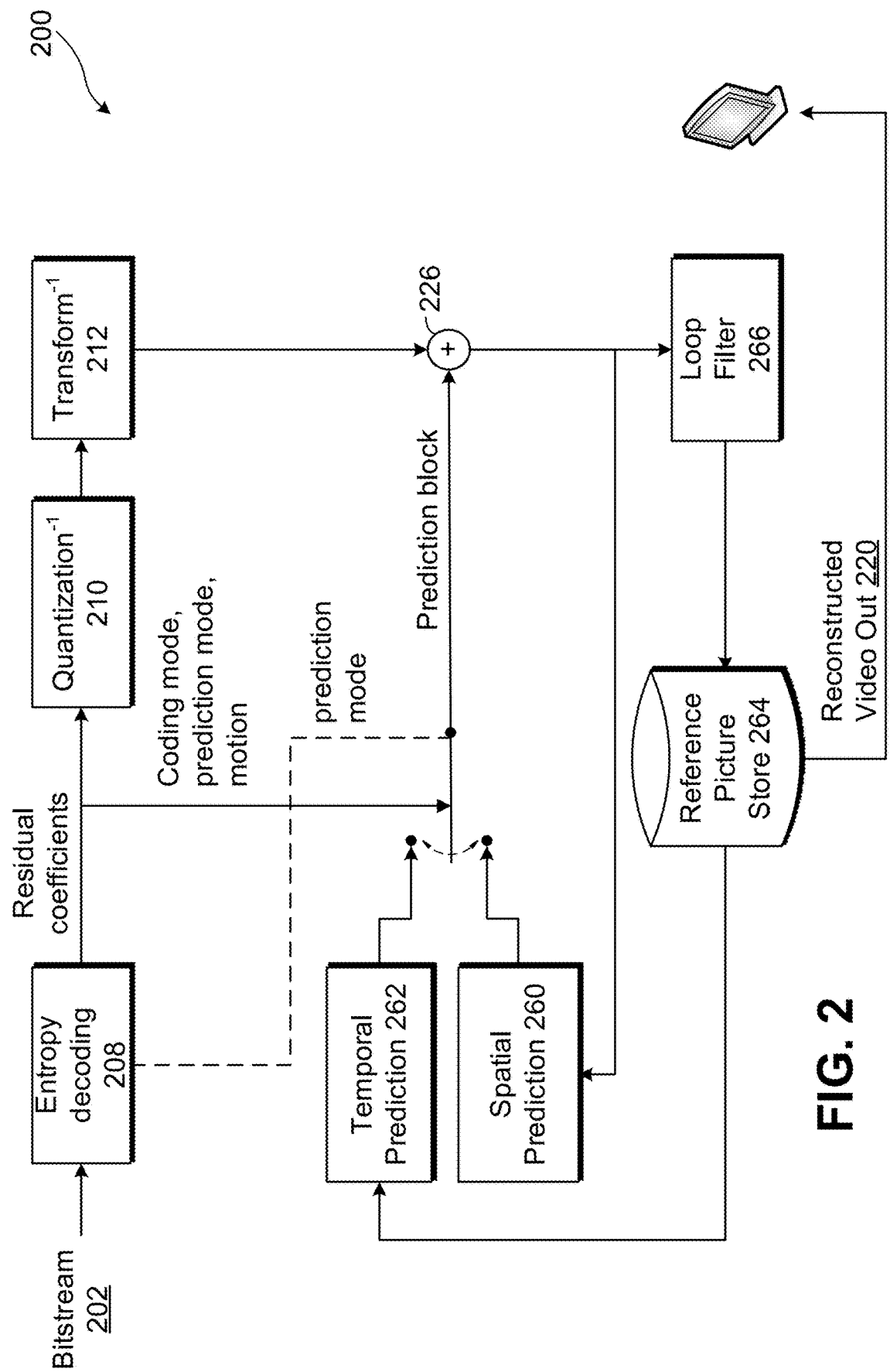
FIG. 2 is a block diagram illustrating an example of a block-based video decoder.

FIG. 2 is a block diagram illustrating an example of a block-based video decoder. The video decoder 200 may receive a video bitstream 202. The video bitstream 202 may be unpacked and/or entropy decoded at entropy decoding unit 208. The coding mode and/or prediction information used to encode the video bitstream may be sent to the spatial prediction unit 260 (e.g., if intra coded) and/or the temporal prediction unit 262 (e.g., if inter coded) to form a prediction block. If inter coded, the prediction information may comprise prediction block sizes, one or more motion vectors (e.g., which may indicate direction and amount of motion), and/or one or more reference indices (e.g., which may indicate from which reference picture to obtain the prediction signal). Motion-compensated prediction may be applied by temporal prediction unit 262 to form a temporal prediction block.

The residual transform coefficients may be sent to an inverse quantization unit 210 and an inverse transform unit 212 to reconstruct the residual block. The prediction block and the residual block may be added together at 226. The reconstructed block may go through in-loop filtering 266 before it is stored in reference picture store 264. The reconstructed video in the reference picture store 264 may be used to drive a display device and/or used to predict future video blocks. The video decoder 200 may output a reconstructed video signal 220. The reference picture store 264 may also be referred to as a decoded picture buffer (DPB).

A video encoder and/or decoder (e.g., video encoder 100 or video decoder 200) may perform spatial prediction (e.g., which may be referred to as intra prediction). Spatial prediction may be performed by predicting from already coded neighboring pixels following one of a plurality of prediction directions (e.g., which may be referred to as directional intra prediction).

Figure 3:
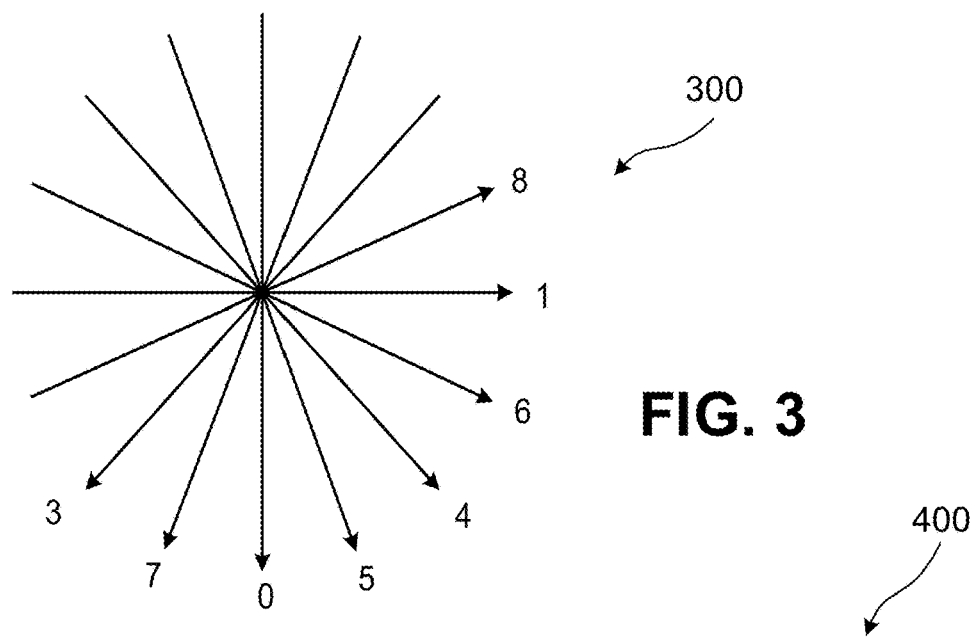
FIG. 3 is a diagram of an example of eight directional prediction modes.

FIG. 3 is a diagram of an example of eight directional prediction modes. The eight directional prediction modes of FIG. 3 may be supported in H.264/AVC. As shown generally at 300 in FIG. 3, the nine modes (including DC mode 2) are:
Mode 0: Vertical Prediction
Mode 1: Horizontal prediction
Mode 2: DC prediction
Mode 3: Diagonal down-left prediction
Mode 4: Diagonal down-right prediction
Mode 5: Vertical-right prediction
Mode 6: Horizontal-down prediction
Mode 7: Vertical-left prediction
Mode 8: Horizontal-up prediction Spatial prediction may be performed on a video block of various sizes and/or shapes. Spatial prediction of a luma component of a video signal may be performed, for example, for block sizes of 4×4, 8×8, and 16×16 pixels (e.g., in H.264/AVC). Spatial prediction of a chroma component of a video signal may be performed, for example, for block size of 8×8 (e.g., in H.264/AVC). For a luma block of size 4×4 or 8×8, a total of nine prediction modes may be supported, for example, eight directional prediction modes and the DC mode (e.g., in H.264/AVC). Four prediction modes may be supported; horizontal, vertical, DC, and planar prediction, for example, for a luma block of size 16×16.

Furthermore, directional intra prediction modes and non-directional prediction modes may be supported.

Figure 4:
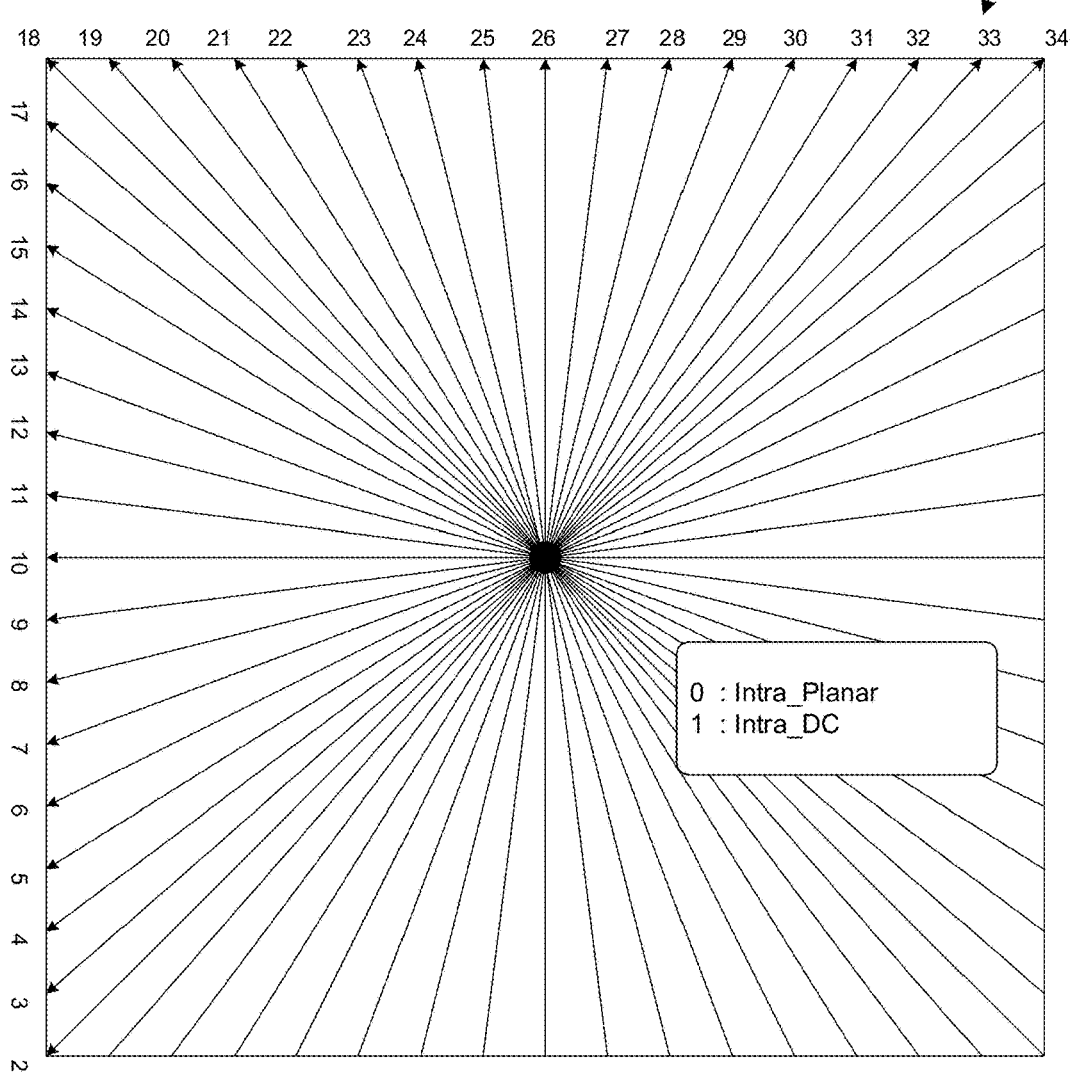
FIG. 4 is a diagram illustrating an example of 33 directional prediction modes and two non-directional prediction modes.

FIG. 4 is a diagram illustrating an example of 33 directional prediction modes and two non-directional prediction modes. The 33 directional prediction modes and two non-directional prediction modes, shown generally at 400 in FIG. 4, may be supported by HEVC. Spatial prediction using larger block sizes may be supported. For example, spatial prediction may be performed on a block of any size, for example, of square block sizes of 4×4, 8×8, 16×16, 32×32, or 64×64. Directional intra prediction (e.g., in HEVC) may be performed with 1/32-pixel precision.

Non-directional intra prediction modes may be supported (e.g., in H.264/AVC, HEVC, or the like), for example, in addition to directional intra prediction. Non-directional intra prediction modes may include the DC mode and/or the planar mode. For the DC mode, a prediction value may be obtained by averaging the available neighboring pixels and the prediction value may be applied to the entire block uniformly. For the planar mode, linear interpolation may be used to predict smooth regions with slow transitions. H.264/AVC may allow for use of the planar mode for 16×16 luma blocks and chroma blocks.

An encoder (e.g., the encoder 100) may perform a mode decision (e.g., at block 180 in FIG. 1) to determine the best coding mode for a video block. When the encoder determines to apply intra prediction (e.g., instead of inter prediction), the encoder may determine an optimal intra prediction mode from the set of available modes. The selected directional intra prediction mode may offer strong hints as to the direction of any texture, edge, and/or structure in the input video block.

Figure 5:
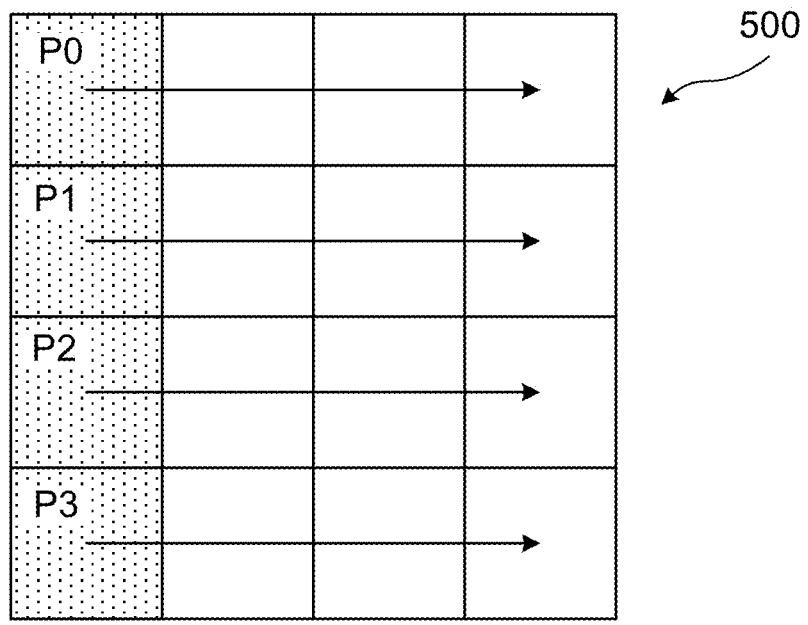
FIG. 5 is a diagram of an example of horizontal prediction.

FIG. 5 is a diagram of an example of horizontal prediction (e.g., for a 4×4 block), as shown generally at 500 in FIG. 5. Already reconstructed pixels P0, P1, P2 and P3 (i.e., the shaded boxes) may be used to predict the pixels in the current 4×4 video block. In horizontal prediction, a reconstructed pixel, for example, pixels P0, P1, P2 and/or P3, may be propagated horizontally along the direction of a corresponding row to predict the 4×4 block. For example, prediction may be performed according to Equation (1) below, where L(x,y) may be the pixel to be predicted at (x,y), x, y=0 . . . 3.

$$L(x,0)=P0$$

$$L(x,1)=P1$$

$$L(x,2)=P2$$

$$L(x,3)=P3 \qquad (1)$$

Figure 6:
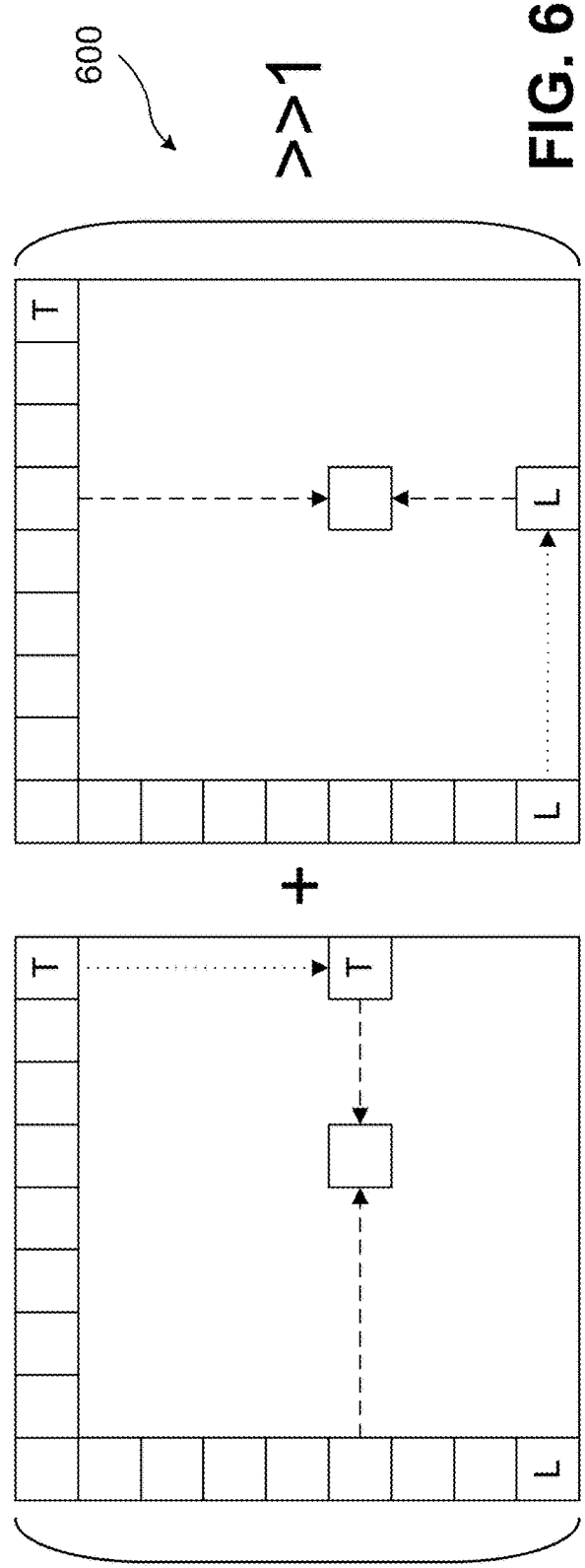
FIG. 6 is a diagram of an example of the planar mode.

FIG. 6 is a diagram of an example of the planar mode, as shown generally at 600 in FIG. 6. The planar mode may be performed accordingly: the rightmost pixel in the top row (marked by a T) may be replicated to predict pixels in the rightmost column. The bottom pixel in the left column (marked by an L) may be replicated to predict pixels in the bottom row. Bilinear interpolation in the horizontal direction (as shown in the left block) may be performed to produce a first prediction H(x,y) of center pixels. Bilinear interpolation in the vertical direction (e.g., as shown in the right block) may be performed to produce a second prediction V(x,y) of center pixels. An averaging between the horizontal prediction and the vertical prediction may be performed to obtain a final prediction L(x,y), using L(x,y)=((H(x,y)+V(x,y))>>1).

Figure 7:
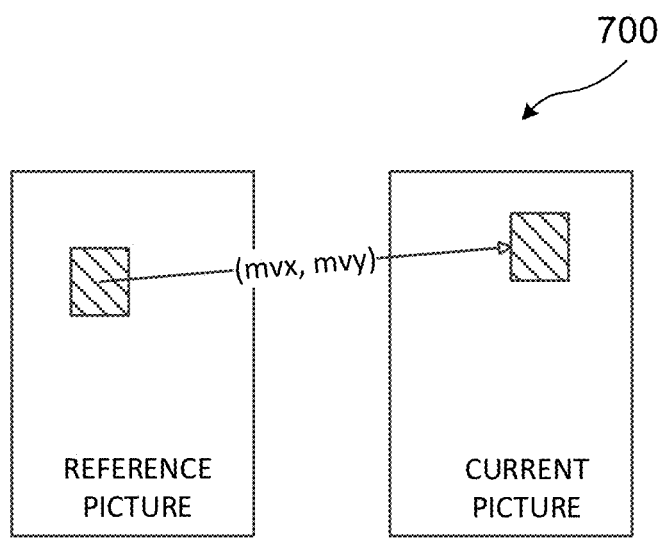
FIG. 7 is a diagram illustrating an example of motion prediction.
Figure 8:
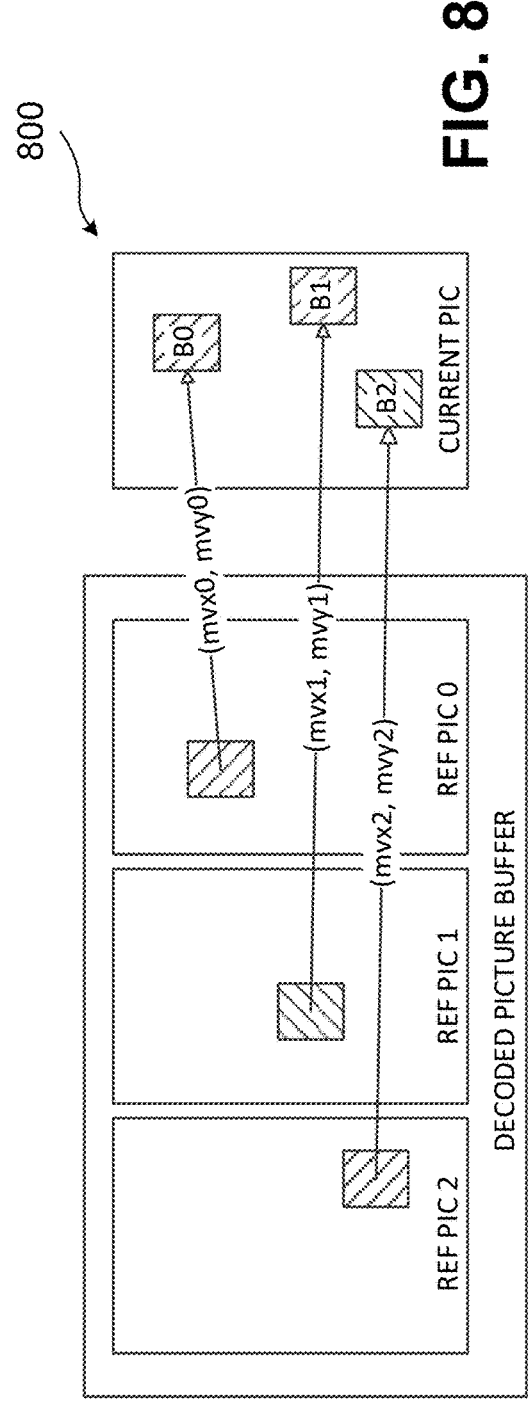
FIG. 8 is a diagram illustrating an example of block-level movement within a picture.

FIG. 7 and FIG. 8 are diagrams illustrating, as shown generally at 700 and 800, an example of motion prediction of video blocks (e.g., using temporal prediction unit 162 of FIG. 1). FIG. 8, which illustrates an example of block-level movement within a picture, is a diagram illustrating an example decoded picture buffer including, for example, reference pictures "Ref pic 0," "Ref pic 1," and "Ref pic2." The blocks B0, B1, and B2 in a current picture may be predicted from blocks in reference pictures "Ref pic 0," "Ref pic 1," and "Ref pic2" respectively. Motion prediction may use video blocks from neighboring video frames to predict the current video block. Motion prediction may exploit temporal correlation and/or remove temporal redundancy inherent in the video signal. For example, in H.264/AVC and HEVC, temporal prediction may be performed on video blocks of various sizes (e.g., for the luma component, temporal prediction block sizes may vary from 16×16 to 4×4 in H.264/AVC, and from 64×64 to 4×4 in HEVC). With a motion vector of (mvx, mvy), temporal prediction may be performed as provided by equation (2):

$$P(x,y)=ref(x-mvx,y-mvy) \qquad (2)$$

where ref(x,y) may be pixel value at location (x,y) in the reference picture, and P(x,y) may be the predicted block. A video coding system may support inter-prediction with fractional pixel precision. When a motion vector (mvx, mvy) has fractional pixel value, one or more interpolation filters may be applied to obtain the pixel values at fractional pixel positions. Block-based video coding systems may use multi-hypothesis prediction to improve temporal prediction, for example, where a prediction signal may be formed by combining a number of prediction signals from different reference pictures. For example, H.264/AVC and/or HEVC may use bi-prediction that may combine two prediction signals. Bi-prediction may combine two prediction signals, each from a reference picture, to form a prediction, such as the following equation (3):

$$P(x,y) = \frac{P_0(x,y) + P_1(x,y)}{2} = \frac{ref_0(x-mvx_0, y-mvy_0) + ref_1(x-mvx_1, y-mvy_1)}{2} \qquad (3)$$

where $P_0(x,y)$ and $P_1(x,y)$ may be the first and the second prediction block, respectively. As illustrated in equation (3), the two prediction blocks may be obtained by performing motion-compensated prediction from two reference pictures $ref_0(x,y)$ and $ref_1(x,y)$, with two motion vectors ($mvx_0$, $mvy_0$) and ($mvx_1$, $mvy_1$), respectively. The prediction block P(x,y) may be subtracted from the source video block (e.g., at 116) to form a prediction residual block. The prediction residual block may be transformed (e.g., at transform unit 104) and/or quantized (e.g., at quantization unit 106). The quantized residual transform coefficient blocks may be sent to an entropy coding unit (e.g., entropy coding unit 108) to be entropy coded to reduce bit rate. The entropy coded residual coefficients may be packed to form part of an output video bitstream (e.g., bitstream 120).

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, multiple layer video coding technologies, such as scalable video coding and/or multi-view video coding, may be designed to handle more than one video layer where each layer may be decoded to reconstruct a video signal of a particular spatial resolution, temporal resolution, fidelity, and/or view. Although a single layer encoder and decoder are described with reference to FIG. 1 and FIG. 2, the concepts described herein may utilize a multiple layer encoder and/or decoder, for example, for multi-view and/or scalable coding technologies.

Scalable video coding may improve the quality of experience for video applications running on devices with different capabilities over heterogeneous networks. Scalable video coding may encode the signal once at a highest representation (e.g., temporal resolution, spatial resolution, quality, etc.), but enable decoding from subsets of the video streams depending on the specific rate and representation required by certain applications running on a client device. Scalable video coding may save bandwidth and/or storage compared to non-scalable solutions. The international video standards, e.g., MPEG-2 Video, H.263, MPEG4 Visual, H.264, etc., may have tools and/or profiles that support modes of scalability.

Table 1 provides an example of different types of scalabilities along with the corresponding standards that may support them. Bit-depth scalability and/or chroma format scalability may be tied to video formats (e.g., higher than 8-bit video, and chroma sampling formats higher than YUV4:2:0), for example, which may primarily be used by professional video applications. Aspect ratio scalability may be provided.

TABLE 1

| Scalability | Example | Standards |
|---|---|---|
| View scalability | 2D→3D (2 or more views) | MVC, MFC, 3DV |
| Spatial scalability | 720p→1080p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video→10-bit video | Scalable HEVC |
| Chroma format scalability | YUV4:2:0→YUV4:2:2, YUV4:4:4 | Scalable HEVC |
| Color Gamut Scalability | BT.709 → BT.2020 | Scalable HEVC |
| Aspect ratio scalability | 4:3→16:9 | Scalable HEVC |

Scalable video coding may provide a first level of video quality associated with a first set of video parameters using the base layer bitstream. Scalable video coding may provide one or more levels of higher quality associated with one or more sets of enhanced parameters using one or more enhancement layer bitstreams. The set of video parameters may include one or more of spatial resolution, frame rate, reconstructed video quality (e.g., in the form of SNR, PSNR, VQM, visual quality, etc.), 3D capability (e.g., with two or more views), luma and chroma bit depth, chroma format, and underlying single-layer coding standard. Different use cases may use different types of scalability, for example, as illustrated in Table 1. A scalable coding architecture may offer a common structure that may be configured to support one or more scalabilities (e.g., the scalabilities listed in Table 1). A scalable coding architecture may be flexible to support different scalabilities with minimum configuration efforts. A scalable coding architecture may include at least one preferred operating mode that may not require changes to block level operations, such that the coding logics (e.g., encoding and/or decoding logics) may be maximally reused within the scalable coding system. For example, a scalable coding architecture based on a picture level inter-layer processing and management unit may be provided, wherein the inter-layer prediction may be performed at the picture level.

Figure 9:
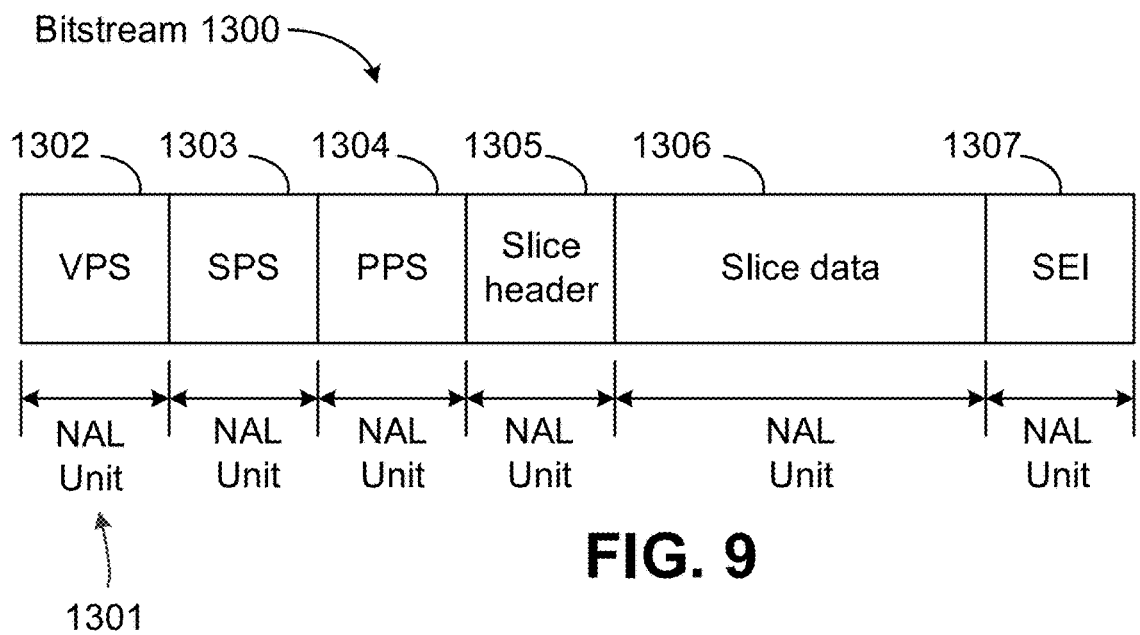
FIG. 9 is a diagram illustrating an example of a coded bitstream structure.

FIG. 9 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Figure 10:
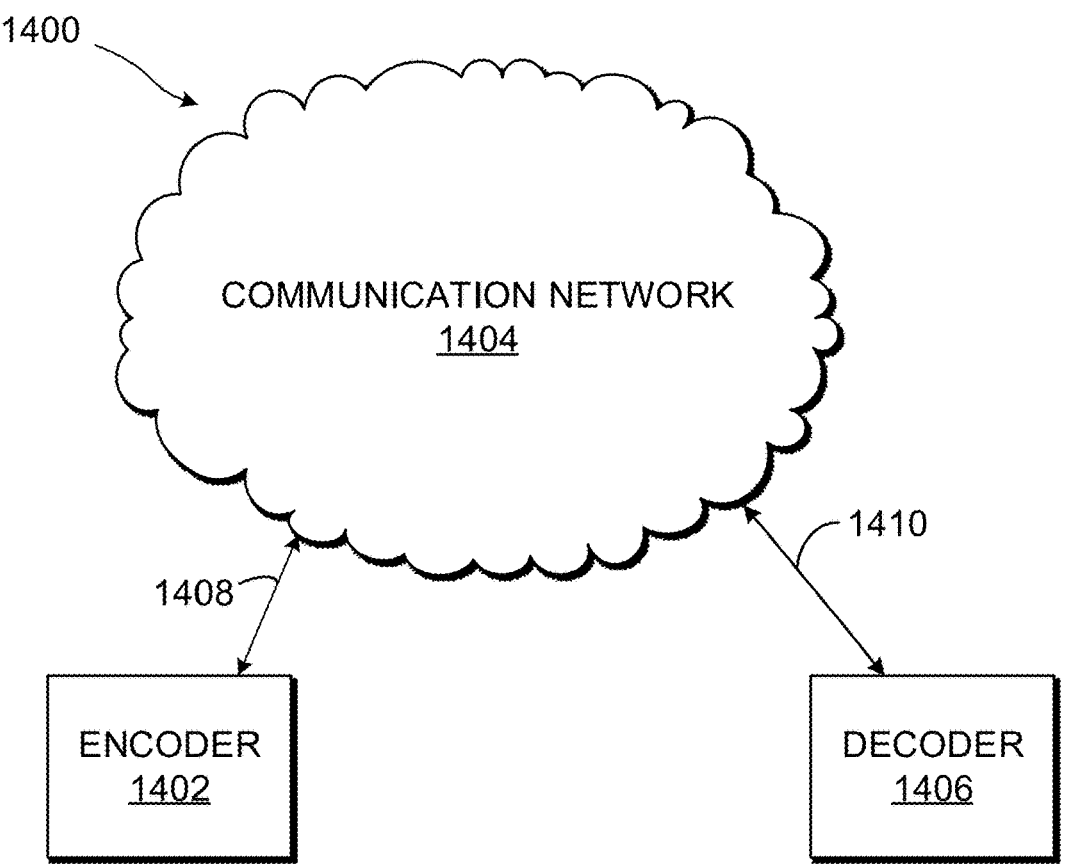
FIG. 10 is a diagram illustrating an example communication system.

FIG. 10 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 1. The encoder 1402 may include a single layer codec (e.g., FIG. 1) or a multilayer codec. For example, the encoder 1402 may be a multi-layer (e.g., two-layer) scalable coding system with picture-level ILP support. The decoder 1406 may be in communication with the network 1404 via a connection 1410, which may be a wireline connection or a wireless connection. The decoder 1406 may be similar to the block-based video decoder of FIG. 2. The decoder 1406 may include a single layer codec (e.g., FIG. 2) or a multilayer codec. For example, the decoder 1406 may be a multi-layer (e.g., two-layer) scalable decoding system with picture-level ILP support.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Figure 11:
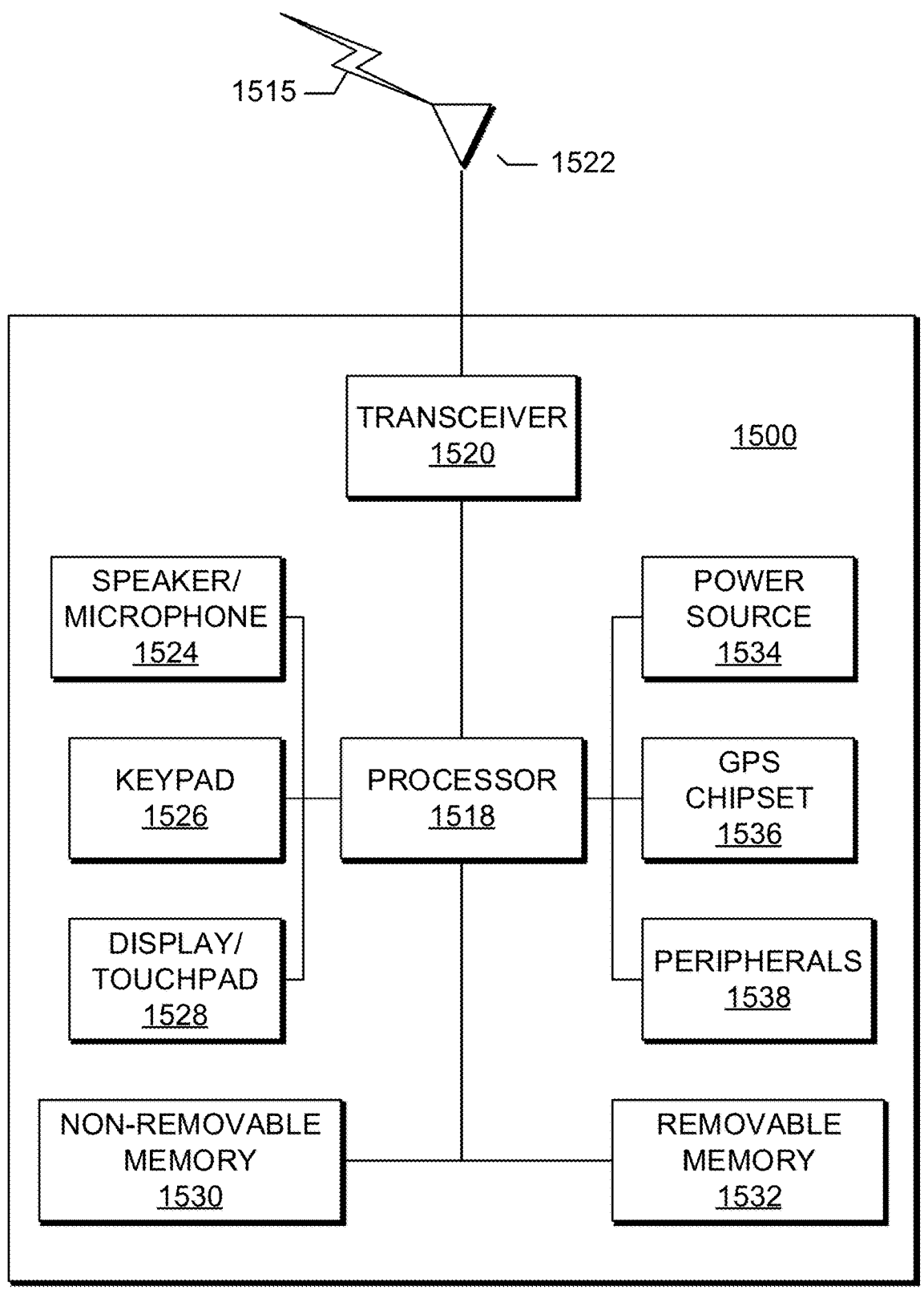
FIG. 11 is a diagram illustrating an example wireless transmit/receive unit (WTRU).

FIG. 11 is a system diagram of an example WTRU. As shown the example WTRU 1500 may include a processor 1518, a transceiver 1520, a transmit/receive element 1522, a speaker/microphone 1524, a keypad or keyboard 1526, a display/touchpad 1528, non-removable memory 1530, removable memory 1532, a power source 1534, a global positioning system (GPS) chipset 1536, and/or other peripherals 1538. It will be appreciated that the WTRU 1500 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1500 of FIG. 11.

The processor 1518 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1518 may perform signal coding, data processing, power control, input/output processing, and/or any other functionality that enables the WTRU 1500 to operate in a wired and/or wireless environment. The processor 1518 may be coupled to the transceiver 1520, which may be coupled to the transmit/receive element 1522. While FIG. 11 depicts the processor 1518 and the transceiver 1520 as separate components, it will be appreciated that the processor 1518 and the transceiver 1520 may be integrated together in an electronic package and/or chip.

The transmit/receive element 1522 may be configured to transmit signals to, and/or receive signals from, another terminal over an air interface 1515. For example, in one or more embodiments, the transmit/receive element 1522 may be an antenna configured to transmit and/or receive RF signals. In one or more embodiments, the transmit/receive element 1522 may be an emitter/detector configured to transmit and/or receive IR, UV, or visible light signals, for example. In one or more embodiments, the transmit/receive element 1522 may be configured to transmit and/or receive both RF and light signals. It will be appreciated that the transmit/receive element 1522 may be configured to transmit and/or receive any combination of wireless signals.

Figure 15:
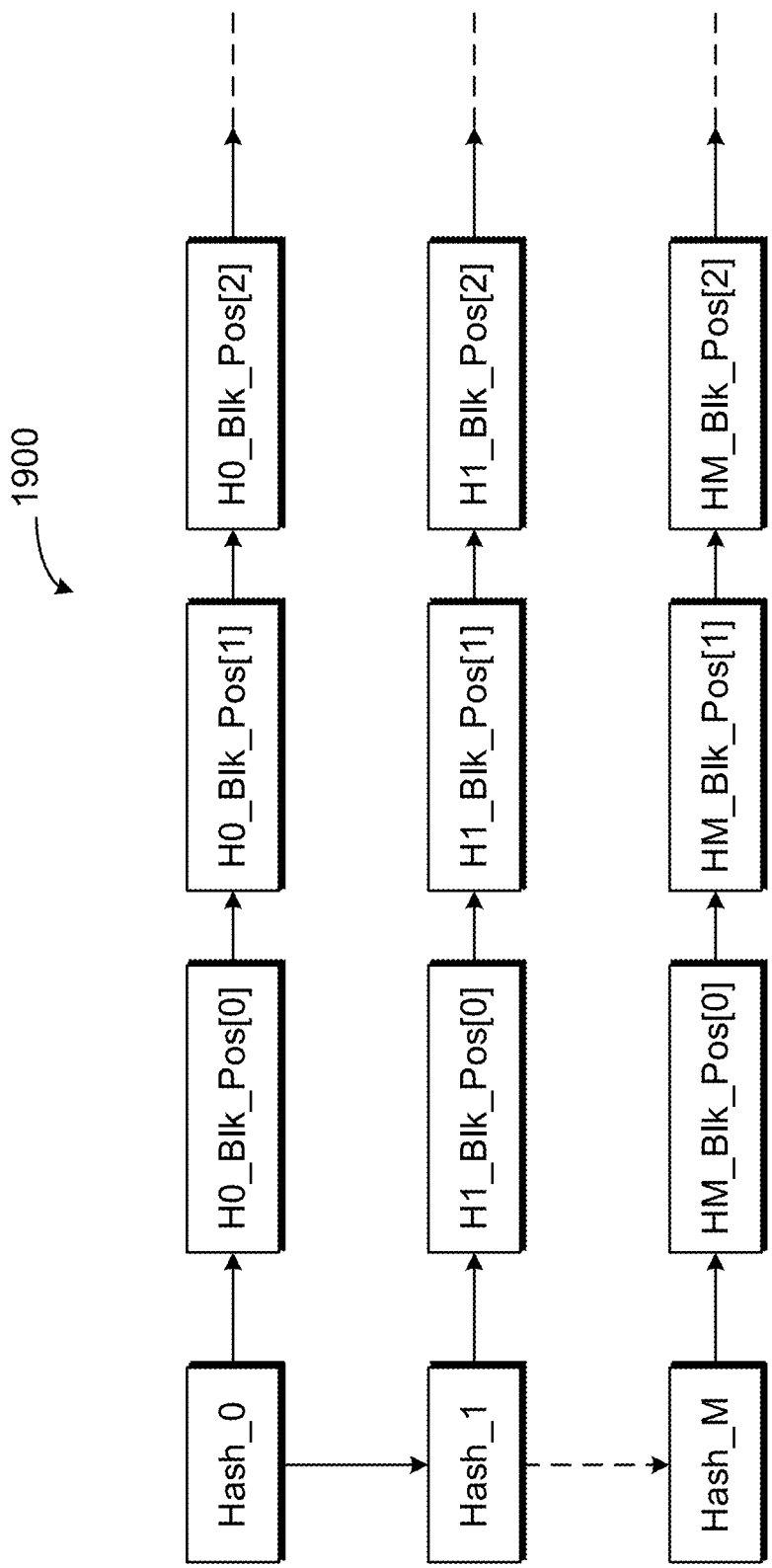
FIG. 15 is a diagram illustrating an example hash table for full frame IntraBC search.

In addition, although the transmit/receive element 1522 is depicted in FIG. 15 as a single element, the WTRU 1500 may include any number of transmit/receive elements 1522. More specifically, the WTRU 1500 may employ MIMO technology. Thus, in one embodiment, the WTRU 1500 may include two or more transmit/receive elements 1522 (e.g., multiple antennas) for transmitting and receiving wireless signals over the air interface 1515.

The transceiver 1520 may be configured to modulate the signals that are to be transmitted by the transmit/receive element 1522 and/or to demodulate the signals that are received by the transmit/receive element 1522. As noted above, the WTRU 1500 may have multi-mode capabilities. Thus, the transceiver 1520 may include multiple transceivers for enabling the WTRU 1500 to communicate via multiple RATs, such as UTRA and IEEE 802.11, for example.

The processor 1518 of the WTRU 1500 may be coupled to, and may receive user input data from, the speaker/microphone 1524, the keypad 1526, and/or the display/touchpad 1528 (e.g., a liquid crystal display (LCD) display unit or organic light-emitting diode (OLED) display unit). The processor 1518 may also output user data to the speaker/microphone 1524, the keypad 1526, and/or the display/touchpad 1528. In addition, the processor 1518 may access information from, and store data in, any type of suitable memory, such as the non-removable memory 1530 and/or the removable memory 1532. The non-removable memory 1530 may include random-access memory (RAM), read-only memory (ROM), a hard disk, or any other type of memory storage device. The removable memory 1532 may include a subscriber identity module (SIM) card, a memory stick, a secure digital (SD) memory card, and the like. In one or more embodiments, the processor 1518 may access information from, and store data in, memory that is not physically located on the WTRU 1500, such as on a server or a home computer (not shown).

The processor 1518 may receive power from the power source 1534, and may be configured to distribute and/or control the power to the other components in the WTRU 1500. The power source 1534 may be any suitable device for powering the WTRU 1500. For example, the power source 1534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1518 may be coupled to the GPS chipset 1536, which may be configured to provide location information (e.g., longitude and latitude) regarding the current location of the WTRU 1500. In addition to, or in lieu of, the information from the GPS chipset 1536, the WTRU 1500 may receive location information over the air interface 1515 from a terminal (e.g., a base station) and/or determine its location based on the timing of the signals being received from two or more nearby base stations. It will be appreciated that the WTRU 1500 may acquire location information by way of any suitable location-determination method while remaining consistent with an embodiment.

The processor 1518 may further be coupled to other peripherals 1538, which may include one or more software and/or hardware modules that provide additional features, functionality and/or wired or wireless connectivity. For example, the peripherals 1538 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1500 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1500 and/or a communication network (e.g., communication network 804) may implement a radio technology such as Universal Mobile Telecommunications System (UMTS) Terrestrial Radio Access (UTRA), which may establish the air interface 1515 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1500 and/or a communication network (e.g., communication network 804) may implement a radio technology such as Evolved UMTS Terrestrial Radio Access (E-UTRA), which may establish the air interface 1515 using Long Term Evolution (LTE) and/or LTE-Advanced (LTE-A).

The WTRU 1500 and/or a communication network (e.g., communication network 804) may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Figure 12:
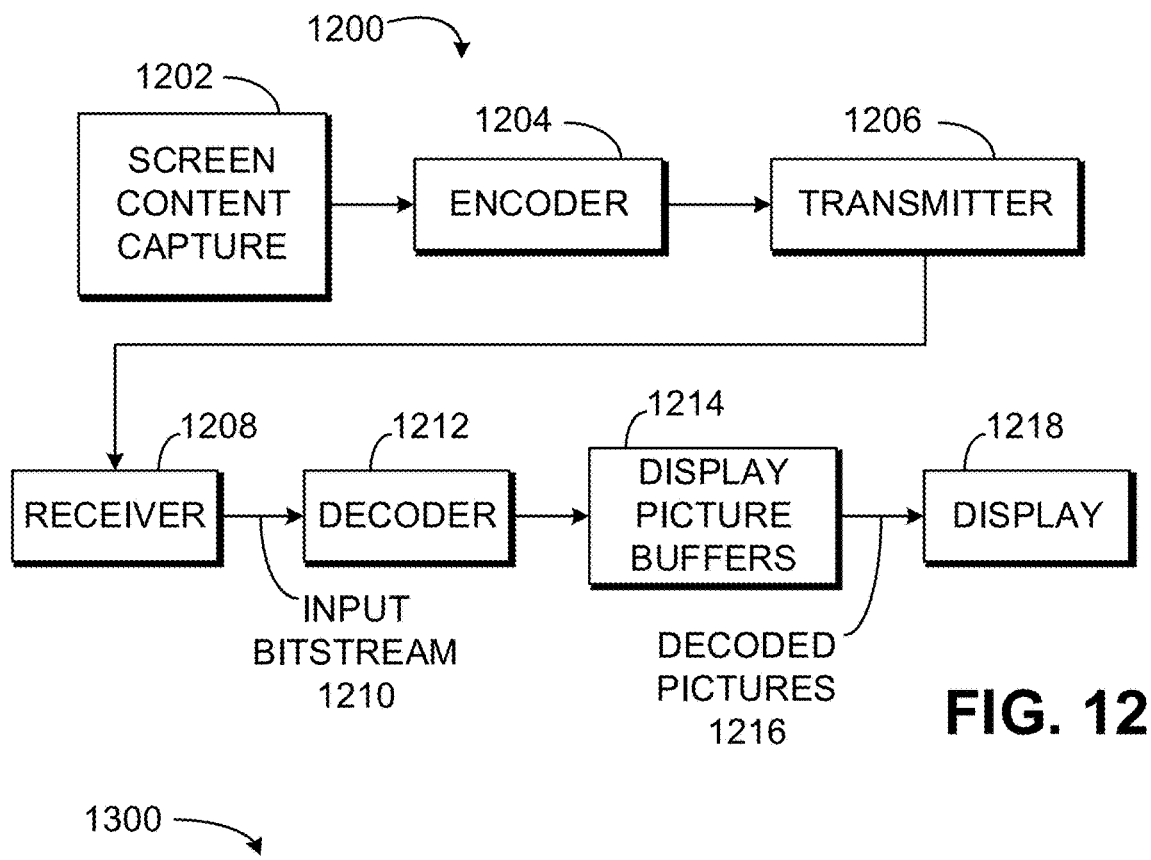
FIG. 12 is a diagram illustrating an example screen-content-sharing system.

FIG. 12 is a diagram illustrating an example screen-content-sharing system. Screen content sharing applications have become more and more popular in recent years with the proliferation of remote desktop, video conferencing, and mobile media presentation applications. FIG. 12 shows the general block diagram of a two-way screen content sharing system 1200. The system includes host sub-system including capturer 1202, encoder 1204, and transmitter 1206, and client sub-system including receiver 1208 (that outputs a received input bitstream 1210), decoder 1212, and display (renderer) 1218. The decoder 1212 outputs to a display picture buffers 1214, which in turn transmits decoded pictures 1216 to the display 1218. There are application requirements from industries [R12, R13] for screen content coding (SCC). Compared to the natural video content, the screen content may contain numerous blocks with several major colors and sharp edges because screen content often includes sharp curves and text content. Although existing video compression methods can be used to encode screen content and then transmit them to a receiver, most existing methods do not fully characterize the feature of screen content, thus leading to a low compression performance and a reconstructed picture with serious quality issues. For example, the curves and texts can be blurred, making it is difficult to recognize them. Therefore, a well-designed screen compression method is important for effectively reconstructing screen content.

Screen content compression methods are becoming important for some specific applications because more and more people share their device content for media presentation or remote desktop purposes. The screen display resolution of mobile devices has greatly increased to high definition or ultra-high definition resolutions. However, existing video coding tools, such as block coding modes and transform, are optimized for natural video encoding and not specially optimized for screen content encoding. Traditional video coding methods increase the bandwidth requirement for transmitting screen content in those sharing applications with some quality requirement settings.

As discussed above, FIG. 2 shows a block diagram of a generic block-based single layer decoder that receives a video bitstream produced by an encoder such as the encoder in FIG. 1, and reconstructs the video signal to be displayed. As also discussed above, at the video decoder, the bitstream is first parsed by the entropy decoder. The residual coefficients are inverse quantized and inverse transformed to obtain the reconstructed residual. The coding mode and prediction information are used to obtain the prediction signal using either spatial prediction or temporal prediction. The prediction signal and the reconstructed residual are added together to get the reconstructed video. The reconstructed video may additionally go through loop filtering before being stored in the reference picture store to be displayed and/or to be used to decode future video signals. As discussed above, FIG. 1 gives a more detailed block diagram of a generic block-based single layer video encoder. As shown in FIG. 1, to achieve efficient compression, a single layer encoder employs widely known techniques such as spatial prediction (also referred to as intra prediction) and temporal prediction (also referred to as inter prediction and/or motion compensated prediction) to predict the input video signal. The encoder also has mode decision logic that chooses the most suitable form of prediction, usually based on certain criterion such as a combination of rate and distortion considerations. [R11] The encoder then transforms and quantizes the prediction residual (the difference signal between the input signal and the prediction signal). The quantized residual, together with the mode information (e.g., intra or inter prediction) and prediction information (motion vectors, reference picture indexes, intra prediction modes, etc.) are further compressed at the entropy coder and packed into the output video bitstream. As shown in FIG. 1, the encoder also generates the reconstructed video signal by applying inverse quantization and inverse transform to the quantized residual to obtain reconstructed residual, and adding it back to the prediction signal. The reconstructed video signal may additionally go through the loop filter process (for example, deblocking filter, Sample Adaptive Offsets, or Adaptive Loop Filters), and is finally stored in the reference picture store to be used to predict a future video signal.

In order to save transmission bandwidth and storage, MPEG has been working on video coding standards for many years. High Efficiency Video Coding (HEVC) [R13] is an emerging video compression standard. HEVC is currently being jointly developed by ITU-T Video Coding Experts Group (VCEG) and ISO/IEC Moving Picture Experts Group (MPEG) together. It can save 50% bandwidth compared to H.264 with the same quality. HEVC is still a block-based hybrid video coding standard, in that its encoder and decoder generally operate according to the manner discussed above in connection with FIG. 1 and FIG. 2. HEVC allows the use of larger video blocks, and uses quadtree partition to signal block coding information. The picture or slice is first partitioned into coding tree blocks (CTB) having the same size (e.g., 64×64). Each CTB is partitioned into CUs with quadtree, and each CU is partitioned further into prediction units (PU) and transform units (TU) also with quadtree. For each inter coded CU, its PU can be one of 8 partition modes, as shown and discussed above in connection with FIG. 3. Temporal prediction, also called motion compensation, is applied to reconstruct all inter coded PUs. Depending on the precision of the motion vectors (which can be up to quarter pixel in HEVC), linear filters are applied to obtain pixel values at fractional positions. In HEVC, the interpolation filters have 7 or 8 taps for luma and 4 taps for chroma. The deblocking filter in HEVC is content based; different deblocking filter operations are applied at the TU and PU boundaries, depending on a number of factors, such as coding mode difference, motion difference, reference picture difference, pixel value difference, and so on. For entropy coding, HEVC adopts context-based adaptive arithmetic binary coding (CABAC) for most block level syntax elements except high level parameters. There are two kinds of bins in CABAC coding: one is context-based coded regular bins, and the other is by-pass coded bins without context.

Although the current HEVC design contains various block coding modes, it does not fully utilize the spatial redundancy for screen content coding. This is because the HEVC is focused on continuous tone video content in 4:2:0 format, and the mode decision and transform coding tools are not optimized for the discrete tone screen content, which is often captured in the format of 4:4:4 video. As the HEVC standard began to mature and stabilize in late 2012, the standardization bodies VCEG and MPEG started to work on the future extension of HEVC for screen content coding. In January 2014, the Call for Proposals (CFP) of screen content coding was jointly issued by ITU-T VCEG and ISO/IEC MPEG [R1]. The CFP received a fair amount of attention, and resulted in responses [R2-R8] from various different companies proposing various efficient SCC solutions. Given that screen content material such as text and graphics show different characteristics compared to natural video content, some coding tools that improve the coding efficiency of screen content coding were proposed, for example, 1D string copy [R9], palette coding [R10,R11] and intra block copy (IntraBC) [R12,R17]. All those screen content coding related tools were investigated in core experiments [R18-R22]. Screen content has highly repetitive patterns in term of line segments or blocks and has a lot of homogeneous small regions (e.g. mono-color regions). Usually only a few colors exist within a small block. In contrast, there are many colors even in a small block for natural video. The color value at each position is usually repeated from its above or left pixel. 1D string copy involves predicting the string with variable length from previous reconstructed pixel buffers. The position and string length will be signaled. Instead of directly coding the pixel value, a palette table is used as a dictionary to record those significant colors. The corresponding palette index map is used to represent the color value of each pixel within the coding block. Furthermore, the "run" values are used to indicate the length of consecutive pixels that have the same significant colors (i.e., palette index) to reduce the spatial redundancy. Palette coding is usually good for large blocks containing sparse colors. An intra block copy involves using the reconstructed pixels to predict current coding blocks within the same picture, and the displacement information—which is referred to as block vector (BV)—is coded.

Figure 13:
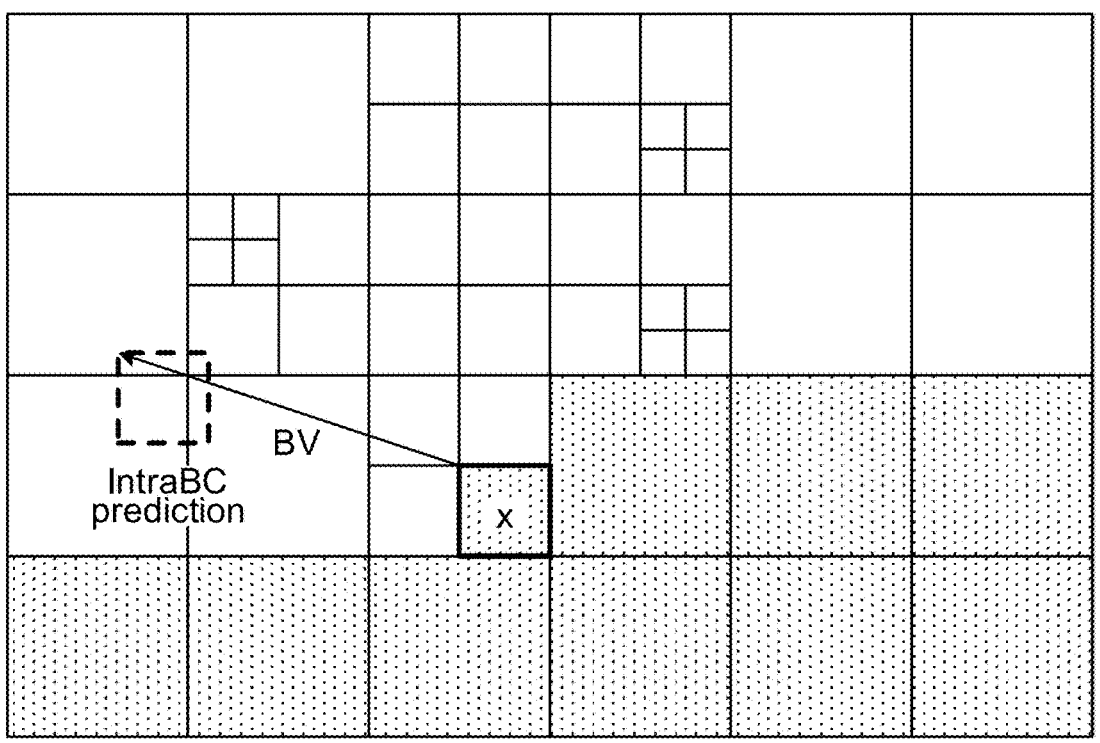
FIG. 13 is a diagram illustrating an example of full frame intra block copy mode.
Figure 13:
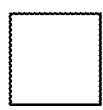
Figure 13:
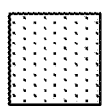

FIG. 13 is a diagram illustrating an example of full frame intra block copy mode. In HEVC, screen content coding extension reference software (SCM-1.0) [R31] has two configurations for intra block copy mode to accommodate different levels of complexity and bandwidth access. A first configuration is full frame intra block copy mode, in which all reconstructed pixels can be used for prediction, as shown generally at 1300 in FIG. 13. In order to reduce the block vector search complexity, hash based intra block copy search has been proposed [R29,R30].

Figure 14:
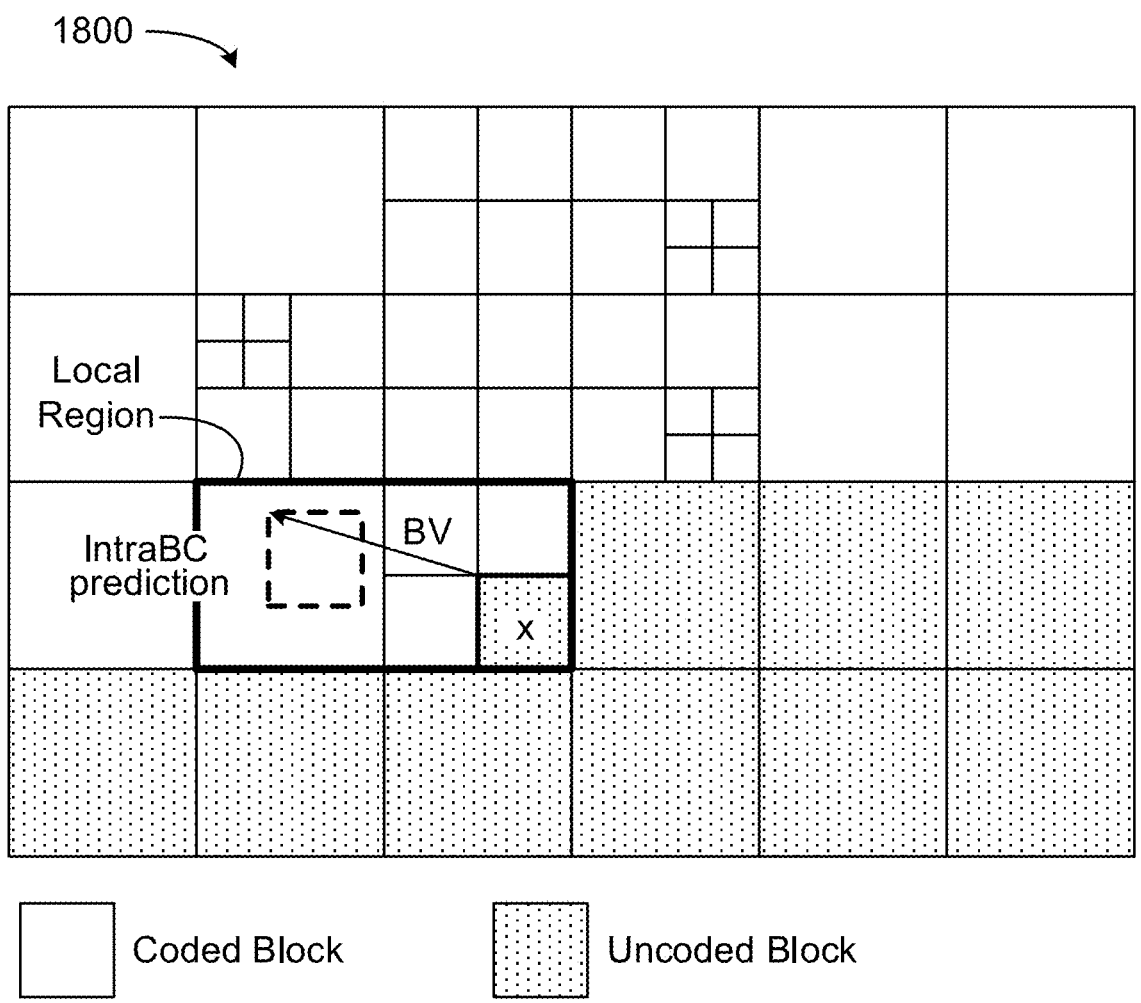
FIG. 14 is a diagram illustrating an example of local region intra block copy mode.

A second configuration is local region intra block copy mode. FIG. 14 is a diagram illustrating an example of local region intra block copy mode, as shown generally at 1800. When local region intra block copy mode is in use, only those reconstructed pixels in the left and current coding tree units (CTU) are allowed to be used as reference.

In order to improve the block vector coding efficiency, various prediction and coding methods have been proposed [R23-R28]. Color space conversion is to encode the signal in another color space such as YCgCo instead of native RGB color space to remove the redundancy of input color space.

Another difference between SCC and natural video coding is that for natural video coding, the coding distortion distributes in the whole picture, whereas for screen content, usually the error locates around strong edges, which makes the artifacts more visible even if the PSNR (peak signal to noise ratio) is quite high for whole picture. Therefore screen content is more difficult to encode from a subjective quality point of view.

Block vector search is performed to find the best block vector used for intra block copy prediction. Block vector search is important for intra block copy coding because the outcome of the search will affect the intra block copy prediction directly. In the full-frame intra block copy configuration, hash-based intra block search has been proposed in order to reduce the search complexity at the encoder side [R29]. The principle is to build a set of hash based tables for each block-size such as 16×16, 8×8.

FIG. 15 is a diagram illustrating an example hash table for full frame IntraBC search. Each entry in the hash table 1900 is a list to store all the positions of those blocks having the same hash value. The block vector of K-th block in the list with same hash value is calculated as follows, shown in equations (4) and (5):

$$BV.x = Blk\_Pos[K].x - Curr\_Blk\_Pos.x \quad (4)$$

$$BV.y = Blk\_Pos[K].y - Curr\_Blk\_Pos.y \quad (5)$$

where Blk_Pos[K] is the (x,y) coordinates of the top left corner of the K-th block, and Curr_Blk_Pos is the (x,y) coordinates of the top left corner of the current block.

The hash value of each block is generated based on block's characteristics such as horizontal and vertical gradient, DC information, or the pixel's cyclic redundancy check (CRC) value. In SCM-1.0, a 16-bit hash value is generated based on 8×8 luma block only.

One process implemented in SCC reference software (SCM-1.0) is a hash table update during the encoding process. Another process implemented in SCC reference software is hash based search for CU encoding. In the hash table update, after each CTU finishes encoding, the top left position of each reconstructed block is inserted in the hash table based on the block's hash value for future IntraBC coding. In the hash-based search, the current block's hash value is calculated. Then the hash table is searched for the current block's hash value. If the current block's hash value exists in hash table, then the list of the corresponding block positions in the hash tables will be used for block vector search. For each block position in the list, the sum of absolute difference (SAD) between the original signal and the IntraBC prediction of the luma component will be compared to find the best block vector with minimal SAD. As one example, if the hash value of the current block is equal to Hash_1 in FIG. 15, then the list of block positions for Hash_1, labeled H1_blk_pos[0], H1_blk_pos[1], and so on, in FIG. 15, will be searched. And among these, the block with the smallest luma SAD will be used as the best block vector.

In HEVC SCC extension reference software SCM-1.0, there are two stages for IntraBC search. The first stage is spatial search, which applies various fast search methods to do a fast search of available video blocks within a given predetermined spatial range. The first stage produces a BV candidate that will be further considered during the second stage. The second stage is a hash-based search of available video blocks as described above. During the second stage, the best BV candidate found in first stage will compared to those in the list of block positions in the hash table, and the final best BV is selected from all of these BV candidates.

Figure 16A:
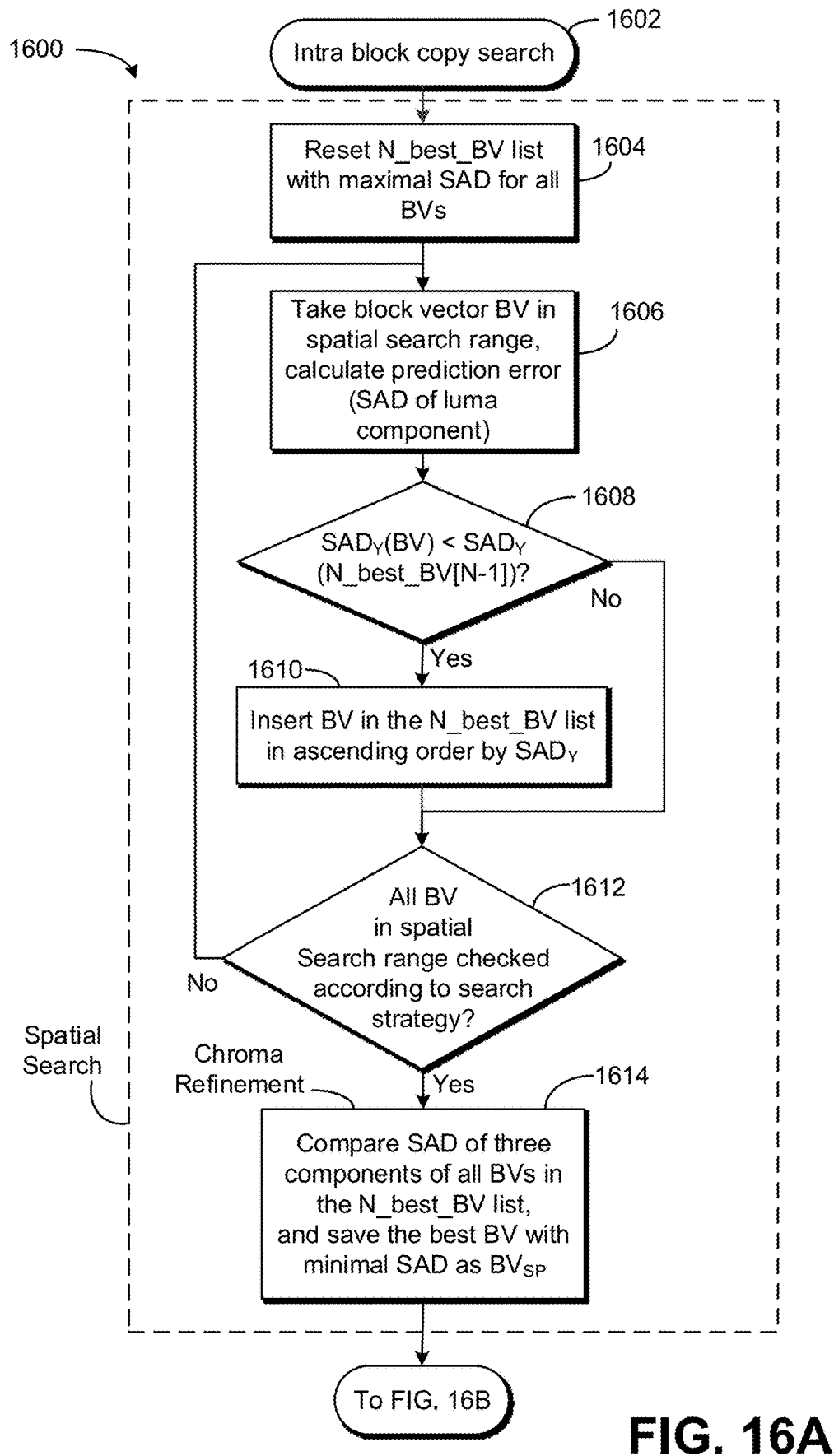
FIGS. 16A and 16B provide a flowchart illustrating an example IntraBC search in SCM-1.0.
Figure 16B:
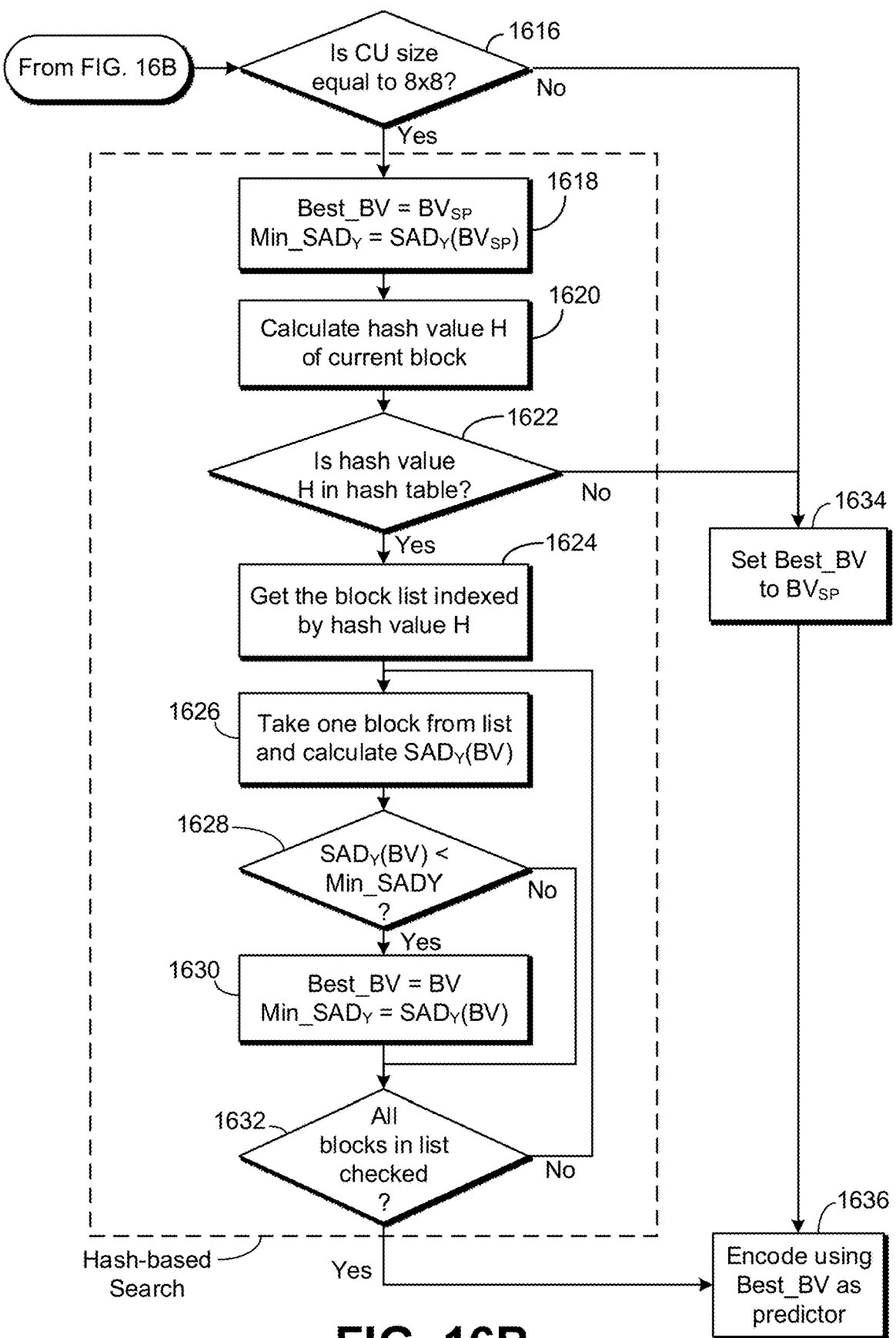

FIGS. 16A-B provide a flowchart illustrating an example IntraBC search in SCM-1.0. In order to reduce the complexity, the second stage of hash based search is only applied to 8×8 block size in SCM-1.0. Therefore, only 8×8 IntraBC search has two stages, and the IntraBC search for all other block size only has one stage. Pang et al. [R32] proposed the use of chroma components for refinement to improve the first search stage of IntraBC search, and the method was included in SCM-1.0 [R31]. Chroma refinement of the first spatial search stage can be divided into two parts: 1) the SAD of the luma component is used to find a number N of the best BV candidates (with the lowest luma SAD), and 2) the best BV is found among the N BV candidates by considering the SAD for all color components including luma and chroma. In SCM-1.0, the chroma refinement is applied to the spatial search stage only. However, when the candidate BV from the first stage is compared to additional BV candidates during the hash search stage, chroma refinement is no longer applied, as only luma based SAD is considered during the second stage search. Therefore, the first search stage and the second search stage in SCM1.0 do not benefit fully from the use of chroma refinement. Some embodiments disclosed herein apply chroma refinement to hash based search to further improve IntraBC search performance for screen content coding.

With respect to FIGS. 16A-B, the example intra block copy search process 1600 is illustrated. In the spatial search portion of the process, step 1604 is performed to reset the N_best_BV list with the maximal SAD for all BVs. In step 1606, for a candidate block vector BV in a spatial search range, the prediction error (SAD of luma component) is calculated through comparison with the current block. Processing next proceeds to a decision box 1608, in which the following condition is evaluated: "$SAD_Y(BV) < SAD_Y(N\_best\_BV[N-1])$?" This condition is evaluated to determine if the luma SAD of the candidate block vector is one of the N best identified so far, where N is a predetermined integer greater than one. If the condition of 1608 is determined to be true, processing proceeds to step 1610 to insert the candidate block vector in the list N_best_BV list in ascending order by $SAD_Y$. If the condition of 1608 is instead determined to be false, step 1610 is bypassed.

Processing next proceeds to decision box 1612, in which the encoder determines whether all candidate block vectors in the spatial search range have been checked. If there are more block vectors in the spatial search range to be checked, processing returns to step 1606 for checking of the remaining candidate block vectors in the spatial search range. If all candidate block vectors in the spatial search range have been checked, then chroma refinement is performed in step 1614. In step 1614, the encoder compares the SAD of three components of all the candidate block vectors in the N_best_BV list. The encoder then saves the best BV with minimal SAD as $BV_{SP}$, representing the best block vector found through spatial search.

In the method of FIGS. 16A-B, hash-based search is performed only if the size of the current CU is equal to 8×8. The encoder determines whether the size of the current CU equal to 8×8 (step 2016). If not, processing proceeds to step 1634, in which the value Best_BV is set to $BV_{SP}$. In step 1636, if the encoder makes the determination to encode the current input video block using intra block copy, then the input video block is encoded using block vector Best_BV as the predictor.

If instead the size of the current CU is equal to 8×8, then a hash-based search is initiated. In step 1618, the value Best_BV is set to $BV_{SP}$, and the value $Min\_SAD_Y$ is set to $SAD_Y(BV_{SP})$. The encoder then calculates the hash value H of the current block (step 1620). In some embodiments, the hash value H is a 16-bit hash value. In some embodiments, for an 8×8 block, the hash value is calculated as $$H = MSB(DC0,3) << 13 + MSB(DC1,3) << 10 + MSB(DC2,3) << 7 + MSB(DC3,3) << 4 + MSB(Grad,4)$$

where MSB(X, n) represents the n most significant bits of X, Grad is the gradient of the block, and DC0, DC1, DC2 and DC3 are the DC values of the four 4×4 sub-blocks of the block.

If the hash value H is not in the current hash table, then Best_BV is not changed from the value $BV_{SP}$. If, on the other hand, the hash value H is found in the current hash table, then the encoder accesses the list of blocks indexed by the hash value H (step 1624).

For each candidate block in the list of blocks indexed by the hash value H, identified by a block vector BV, the encoder calculates $SAD_Y(BV)$ for the candidate block with respect to the current block (step 1626). If the calculated value of $SAD_Y(BV)$ is the lowest yet encountered for the current block (that is, if $SAD_Y(BV) < Min\_SAD_Y$), as determined in step 1628, then the value of Best_BV is reset to the value of the block vector associated with the candidate block, and $Min\_SAD_Y$ is set to $SAD_Y(BV)$ in step 1630.

Steps 1626, 1628, and 1630 are repeated for each of the candidate blocks having the same hash value H as the current block. In step 1632, the encoder determines whether all candidate blocks with the same hash value H as the current block have been checked. If so, then if the encoder makes the determination to encode the current video input block using intra block copy, the input video block is encoded using block vector Best_BV as the predictor in step 1636.

In this disclosure, correlation-based refinement is proposed to be applied to hash-based search in the second stage of IntraBC search. Different methods can be used to improve IntraBC search by considering the correlation-based refinement in the whole process, as discussed below.

Figure 17A:
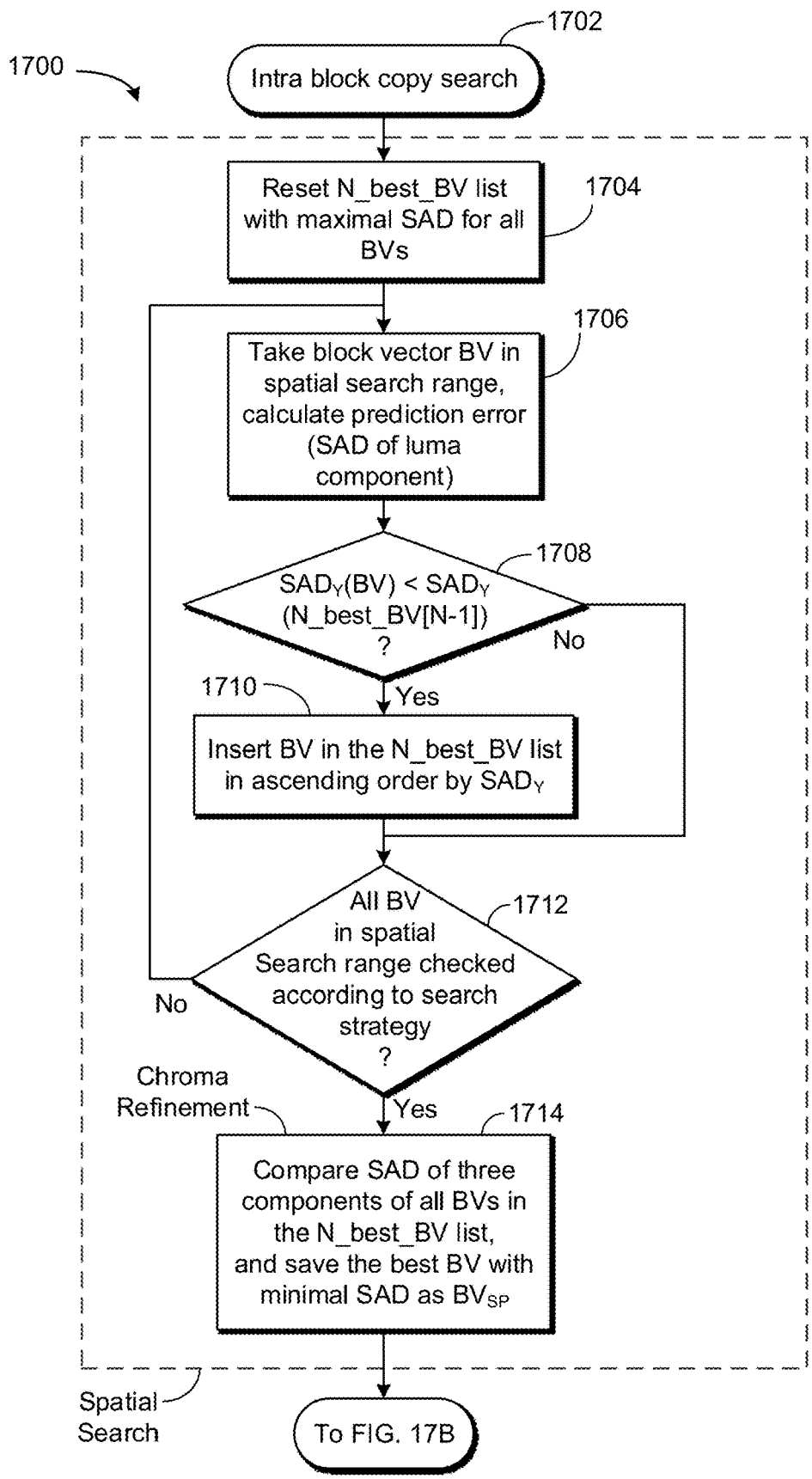
FIGS. 17A and 17B provide a flowchart illustrating a first example of an IntraBC search method.
Figure 17B:
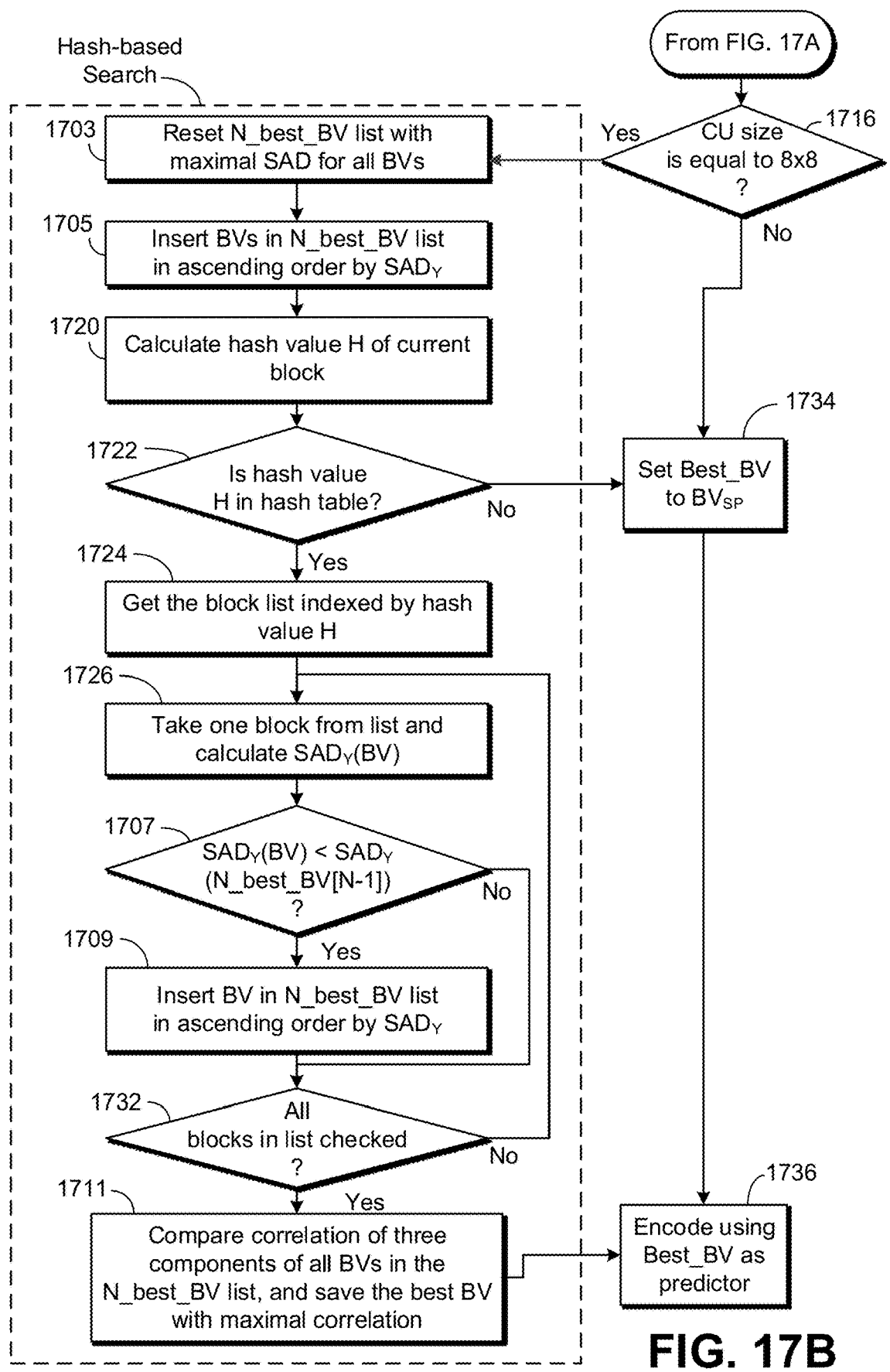

FIGS. 17A-B provide a flowchart illustrating an embodiment of an IntraBC search method. The method 1700 involves applying correlation-based refinement in the hash-based search stage. In the IntraBC search in SCM-1.0 shown in FIGS. 16A-B, the chroma refinement is applied in the spatial search stage, and there is no refinement applied in the hash-based search stage for 8×8 CUs. The spatial search steps performed in FIGS. 17A-B may be performed in the same manner as the spatial search steps of FIGS. 16A-B as described in SCM-1.0 [R31]. In various embodiments, the predetermined spatial range searched in the spatial search stage may include an entire picture, or it may be limited to, for example, only those reconstructed blocks in the left and current coding tree units (CTU), or only those blocks directly above or to directly to the left of the current block, among other possibilities.

In the method of FIGS. 17A-B, during the hash-based search, first the list of block positions that has the same hash value as that of the current block is identified, as described above. Because the list may contain many block positions, in order to reduce computational complexity in the hash-based search stage, the method 1700 does not perform a comparison of the SAD of three components for every block in the list. Instead, the method 1700 involves first selecting the N best candidates from the list based on the SAD of luma component. The encoder then selects the final best BV from the N candidates based on the correlation of luma and chroma in the correlation-based refinement process, which is further discussed below.

In method 1700, an intra block copy search is initiated in step 1702, and the list of best block vectors is initialized in step 1704. In step 1706, the encoder identifies a candidate block vector in the spatial search range and calculates the luma SAD for the corresponding candidate block with respect to the current block being coded. In step 1708, the encoder determines whether the calculated SAD is one of the N best that have been calculated. If so, then in step 1710, the candidate block vector is inserted in the list of the N best block vectors tested to that point. The process continues for each of the candidate block vectors in the spatial search range until it is determined in step 1712 that all such candidates have been considered. In step 1714, the N best candidate block vectors as selected based on luma SAD are evaluated using three-component SAD, and the best candidate block vector is saved as $BV_{SP}$, the best candidate block vector found in the spatial search.

In performing the intra block copy search method 1700, the encoder determines in step 1716 whether the size of the current coding unit is equal to 8×8. If so, a further hash-based search is conducted. Otherwise, the block vector $BV_{SP}$ found in the spatial search is used as the final best block vector Best_BV (step 1734).

If the size of the current coding unit is equal to 8×8, then a hash-based search is performed. The list of the N best block vectors found using luma SAD is again initialized in steps 1703 and 1705. In step 1720, the hash value H of the current block is calculated. In step 1722, the encoder determines whether the hash value H is found in the hash table. If not, then the block vector $BV_{SP}$ found in the spatial search is used as the final best block vector Best_BV (step 1734). Otherwise, in step 1724, the encoder retrieves the block list indexed by the hash value H. For each of the listed blocks, the encoder calculates the luma SAD as compared to the current block being coded (step 1726) and determines in step 1707 whether the candidate block is one of the N best candidates found so far based on luma SAD. If so, then that candidate is inserted in the list of the N best candidates in step 1709. The hash-based search is repeated until the encoder determines in step 1732 that each candidate block in the list of blocks with hash value H has been checked.

In step 1711, the encoder calculates a correlation for each of the N best block vectors found through the spatial and hash-based searches of luma SAD values, and the block with the best correlation is saved as the best block vector Best_BV. In step 1736, if the encoder makes the determination to encode the current video input block using intra block copy, the input video block is encoded using block vector Best_BV as the predictor.

Figure 18A:
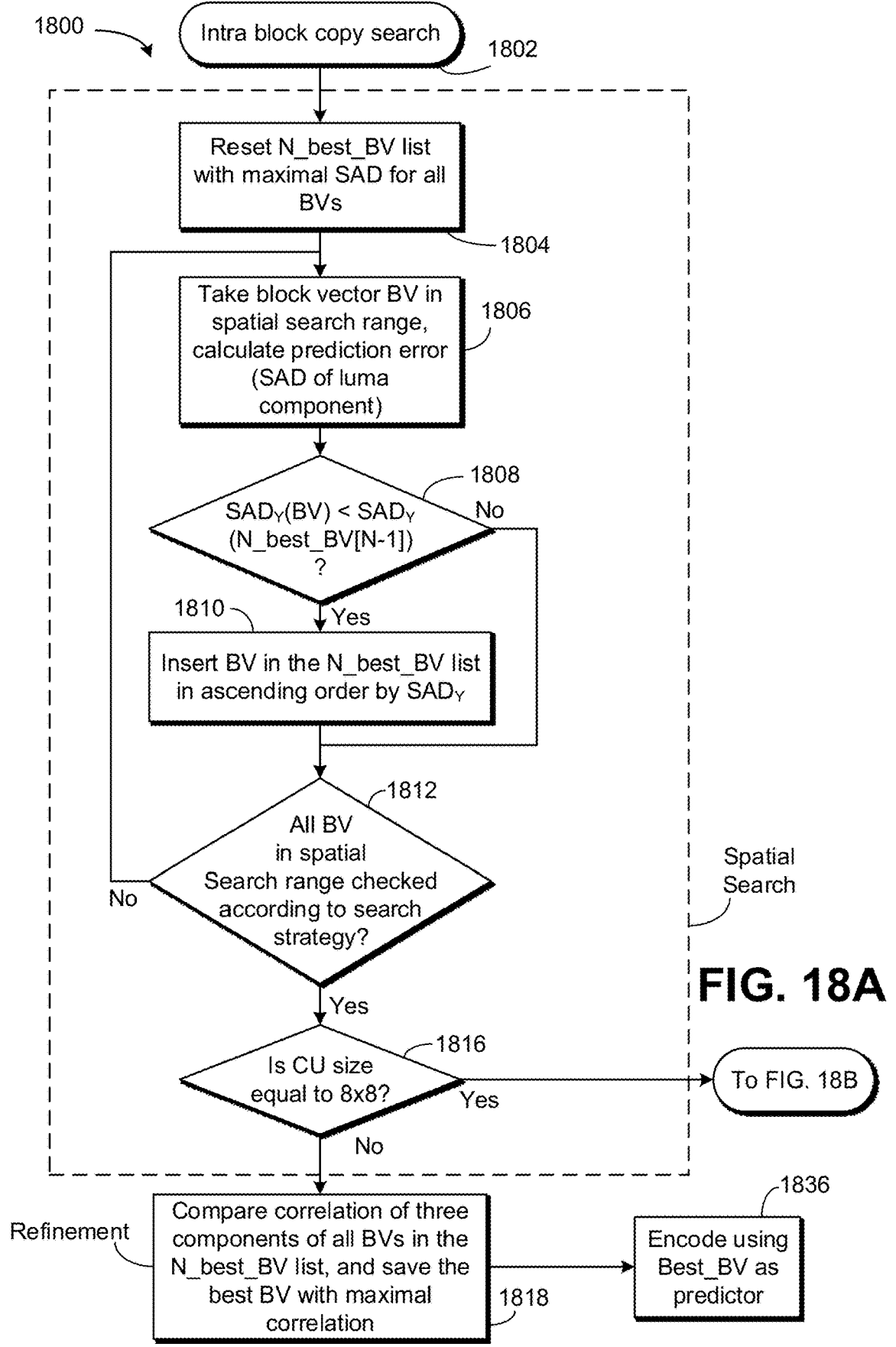
FIGS. 18A and 18B provide a flowchart illustrating a second example of an IntraBC search method.
Figure 18B:
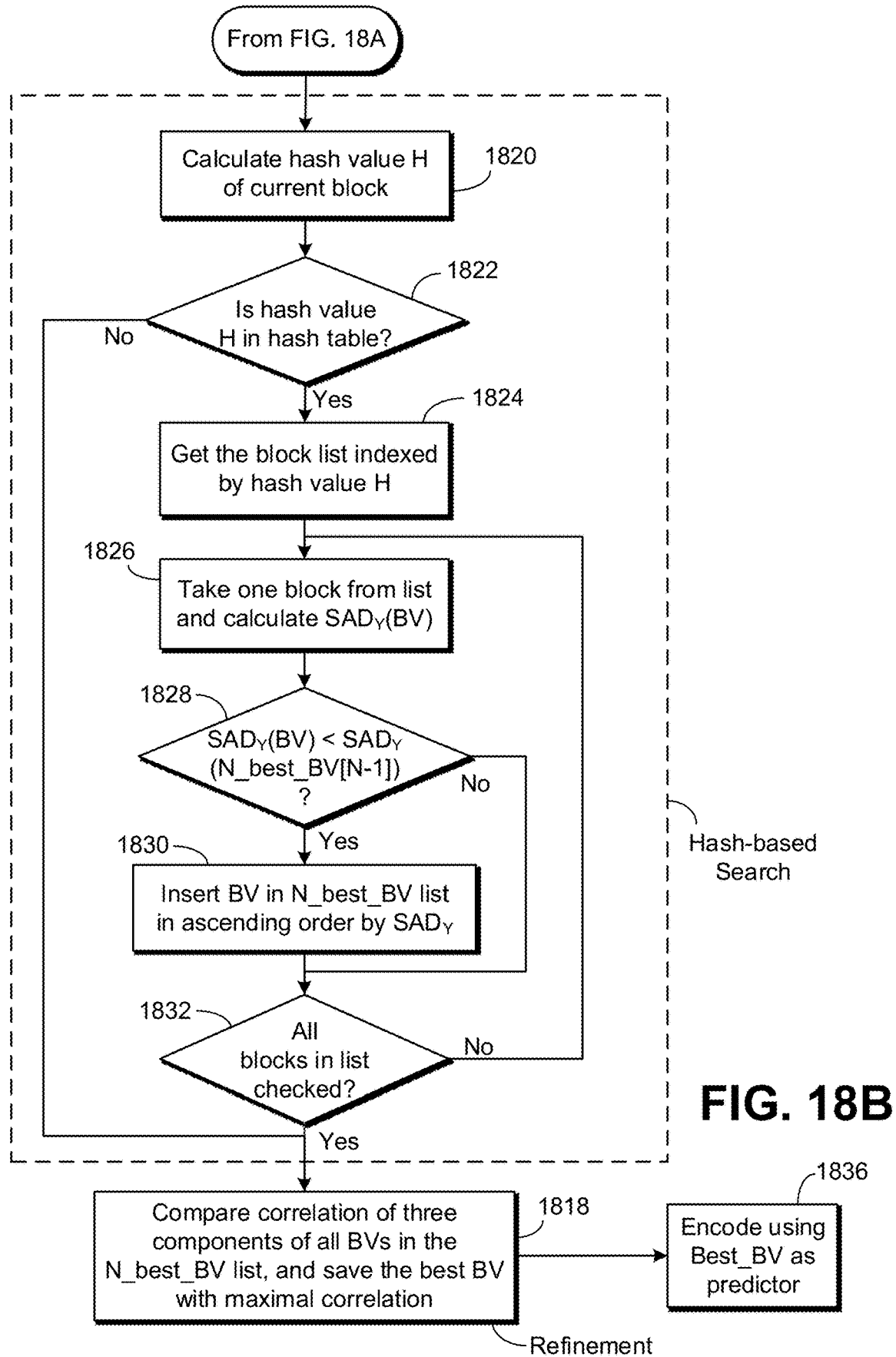

Another exemplary intra block copy search method 1800 is illustrated in the flow chart of FIGS. 18A-B. In method 1800, both spatial search and hash search are changed to further reduce the complexity compared to method 1700. In method 1800, rather than having only one best BV as the output of the spatial search stage, the spatial search stage is changed to output a list of N candidate BVs, and this list is generated by comparing the SAD of only the luma component for those blocks in the search range. Compared to SCM-1.0, chroma refinement at this stage is removed. This list of best N candidates from the spatial search stage is used in the hash-based search stage. This is referred to as the N-candidate list. In hash-based search, the list of block positions in the hash table that has the same hash value as that of the current block is first identified. This is referred to as the hash table list. Then, the N-candidate list is updated by checking all blocks in the hash table list. If a block in the hash table list has lower SAD of the luma component than the entries in the N-candidate list, then the N-candidate list is updated by replacing an existing entry with the highest luma SAD with the new block from the hash table list. In this way, after all blocks from the hash table list are checked, the N-candidate list will be updated to contain BV candidates from the spatial search stage and the hash search stage that have the smallest luma SAD. The correlation-based refinement is applied to the updated N-candidate list, where the correlation of all color components is compared among the entries in the N-candidate list. The entry with the highest overall correlation of all color components is selected as the final BV. (The phrase "all color components" as used herein refers to both luma and chroma components.) Compared to method 1700, the refinement process is only applied once, and thus the complexity of method 1800 is lower.

In FIGS. 18A-B, an intra-block copy search is initiated (step 1802) and the list N_best_BV is initialized (step 1804). The encoder calculates the luma SAD for each block vector in the spatial search range (step 1806) and determines whether that luma SAD is one of the N best determined thus far (step 1808). If so, the associated block vector is inserted into the list N_best_BV (step 1810). Steps 1806, 1808, and 1810 are repeated until the encoder determines in step 1812 that all block vectors in the spatial search range have been checked. If the encoder determines in step 1816 that the current block size is other than 8×8, then correlation-based refinement is performed in step 1818. In the correlation-based refinement, the encoder determines which of the block vectors in the list of N best block vectors (based on luma SAD) is associated with a candidate block having the maximal correlation with the current block. In step 1836, if the encoder makes the determination to encode the current video input block using intra block copy, the input video block is encoded using block vector Best_BV as the predictor. (Steps 1818 and 1836 are shown in both FIG. 18A and FIG. 18A for ease of illustration.)

If the encoder determines in step 1816 that the current block size is 8×8, then the encoder performs a hash-based search. The encoder calculates a hash value H of the current block (step 1820) and determines whether the hash value H is found in the hash table (step 1822). If not, the refinement of step 1818 is performed on the list of N best block vectors based on the luma SAD. If the hash value H is found in the hash table, the encoder retrieves the block list corresponding to hash value H (step 1824) and, for each listed candidate block, the encoder calculates the luma SAD (step 1826). If the calculated luma SAD is one of the N best (step 1828) then the list N_best_BV is updated by inserting the appropriate block vector (step 1830). After the encoder determines that all blocks in the list have been checked (step 1832), correlation-based refinement is performed on the updated list in step 1818.

The correlation-based refinement is performed to find the most correlated block in the N-candidate list by determining a correlation between the candidate block and the current block. One method of determining a correlation between the candidate block and the current block is to calculate the negative of the SAD of all components as shown in Eq. (6). In that case, the refinement process is the same as chroma refinement. In Eq. (6), SB is the block from N-candidate list, CB is the current block, c is the component index, and M is the number of components.

$$\mathrm{Cor}(SB,CB) = -\Sigma_{C=0}^{M} SAD_C(SB,CB) \qquad (6)$$

In another embodiment, the correlation is a function of Jaccard similarity by considering three components, which places less of a burden on the processing resources of the given computing system. The similarity of pixel p, q is defined as $$J(p,q) = \frac{\min(L(p),L(q)) + \min(Cb(p),Cb(q)) + \min(Cr(p),Cr(q))}{\max(L(p),L(q)) + \max(Cb(p),Cb(q)) + \max(Cr(p),Cr(q)) + \varepsilon} \qquad (7)$$

$$\mathrm{Cor}(SB,CB) = \Sigma_{i=0}^{63} J(SB(i),CB(i)) \qquad (8)$$

where SB(i) is the i-th pixel of block SB. CB(i) is the i-th pixel of block CB. ε is a small constant positive value to avoid dividing by 0. L(p) is the luma component of pixel p, and Cb(p) and Cr(p) are the chroma components of pixel p.

In another embodiment, the correlation is measured using the Hamming distance between of two high-precision hash values of the block SB and CB. This high-precision hash, e.g. 32 bit CRC hash value can be generated using luma and chroma pixel values. This hash generation is different from the 16-bit hash value used in hash-based search. The correlation is defined as:

$$\text{Cor}(SB,CB) = -\text{Hamming}(\text{HP\_Hash}(SB), \text{HP\_Hash}(CB)) \quad (9)$$

where HP_Hash is the high-precision hash based on all color components including luma and chroma components. Using equation (9) for the correlation calculation, the method 1800 becomes a two-stage or hierarchical hash-based method, where the first stage hash search uses low-precision hash, e.g. using only the luma component on a larger set of candidate block positions, and the second stage hash search uses high-precision hash e.g. using all color components on a pre-selected (e.g. reduced) set of candidate block positions from the first stage.

Figure 19A:
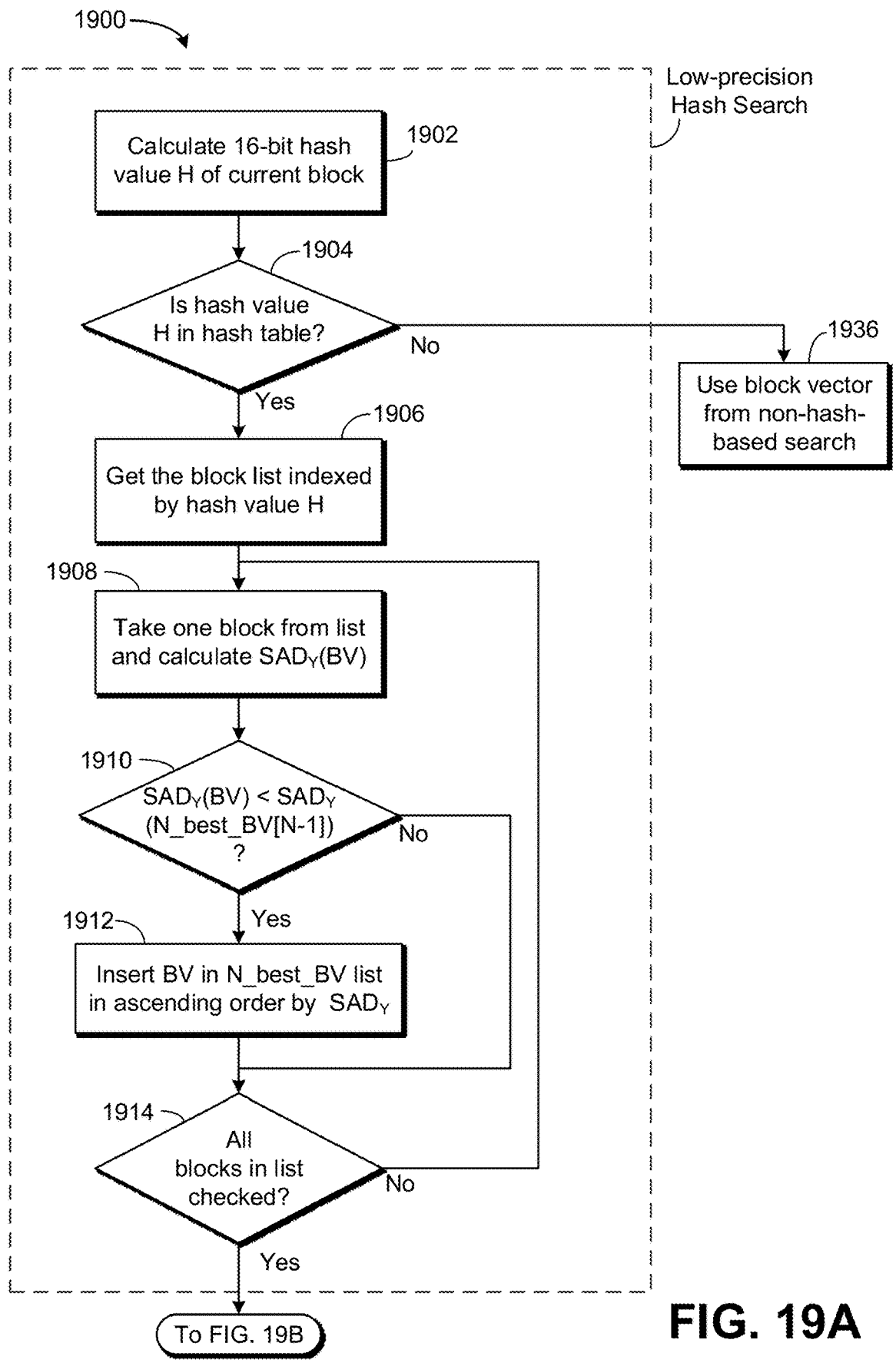
FIGS. 19A and 19B provide a flowchart illustrating an example of a hierarchical hash search.
Figure 19B:
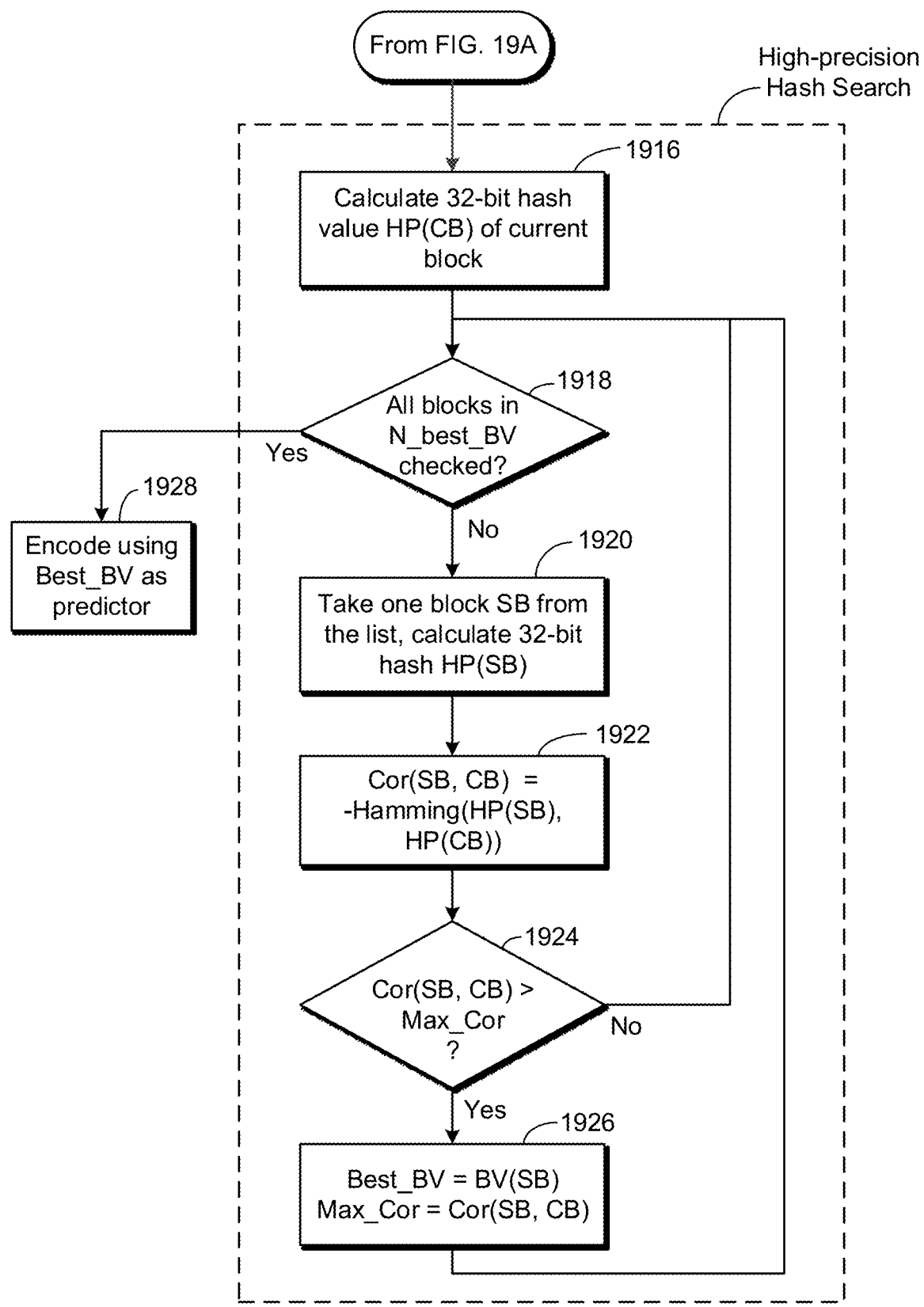

FIGS. 19A-B illustrate an example of a hierarchical hash search with low precision hash (e.g. 16-bit) and high precision (e.g. 32-bit) hash. In step 1902, the encoder calculates a 16-bit hash value H of the current block to be encoded. If the encoder determines in step 1904 that the hash value H is found in the hash table, then the corresponding list of blocks with hash value H is retrieved in step 1906. For each candidate block in the list, the encoder calculates the corresponding luma SAD in step 1908. In step 1910, the encoder determines whether the calculated luma SAD is one of the N best candidates. If so, the corresponding block vector is inserted in the list N_best_BV in step 1912. Steps 1908, 1910, and 1912 are repeated until the encoder determines in step 1914 that all candidate blocks in the list of blocks with hash value H have been checked. If the encoder determines in step 1904 that the hash value H is not in the hash table, then a block vector predictor can be selected in step 1936 using a non-hash based search, such as a spatial search.

After all blocks have been checked with the low-precision hash, the encoder performs a second-stage hash-based search. In step 1916, the encoder calculates a 32-bit hash value HP(CB) of the current block. In step 1920, the encoder identifies a candidate block SB from the list N_best_BV, and the encoder calculates the 32-bit hash HP(SB) of the candidate block. In step 1922, the encoder calculates the correlation Cor(SB,CB) between the candidate block and the current block. In the example of FIGS. 19A-B, correlation is calculated as the negative of the Hamming distance between HP(SB) and HP(CB). If the encoder determines in step 1924 that the calculated correlation is the highest yet encountered, then the correlation value and the block vector SB corresponding to the candidate block are stored in step 1926. Steps 1920, 1922, 1924, and 1926 are repeated until the encoder determines in step 1918 that all blocks in the list N_best_BV have been checked. Once all the blocks in the list N_best_BV have been checked, in step 1928, if the encoder makes the determination to encode the current video input block using intra block copy, the input video block is encoded using block vector Best_BV as the predictor.

ALTERNATIVE EMBODIMENTS

In an exemplary embodiment, an intra block copy search method includes application of correlation-based refinement in a hash-based search algorithm.

In another exemplary embodiments, an intra block copy search method includes determining a hash value for a current block and identifying in a list of block positions those positions that have the same hash value as that of the current block. A number N of candidates are selected based on a sum of absolute different of luma components. A best block vector is selected from the N candidates based on the correlation of luma and chroma using a correlation based refinement algorithm. In some such embodiments, the correlation-based refinement algorithm comprises finding the most correlated block in N-candidate list by comparing the correlation between each candidate block and a current block.

In some such embodiments, the correlation of two blocks is the negative of the sum of absolute differences (SAD) of all components. For example, the correlation-based refinement is performed in some such embodiments according to the equation $\text{Cor}(SB, CB) = -\Sigma_{c=0}^{M} \text{SAD}_c(SB, CB)$, where SB is a block from an N-candidate list, and CB is a current block, c is the component index, and where M is the number of components.

In some embodiments, the correlation-based refinement algorithm incorporates a similarity measure based on consideration of three components. In some such embodiment, the similarity measure J(p,q) between pixels p and q is provided by, $$J(p,q) = \frac{\min(L(p), L(q)) + \min(Cb(p), Cb(q)) + \min(Cr(p), Cr(q))}{\max(L(p), L(q)) + \max(Cb(p), Cb(q)) + \max(Cr(p), Cr(q)) + \varepsilon};$$

and, the correlation is given by $\text{Cor}(SB, CB) = \Sigma_{i=0}^{63} J(SB(i), CB(i))$, where SB(i) is the i-th pixel of block SB, CB(i) is the i-th pixel of block CB, and s is a small constant positive value.

In some embodiments, the correlation-based refinement algorithm is based on a Hamming distance between two high precision hash values of the block SB and CB. In some of these embodiments, the high precision hash is a 32 bit cyclic redundancy check (CRC) hash value generated using luma and chroma pixel values. In some such embodiments, the correlation-based refinement algorithm is:

$$\text{Cor}(SB,CB) = -\text{Hamming}(\text{HP\_Hash}(SB), \text{HP\_Hash}(CB)),$$

where HP_Hash is high precision hash based on all color components.

In an exemplary embodiment, an intra block copy search method includes performing a two-stage hash based search, where a first stage hash search uses low precision hash, and the second stage hash search uses high precision hash. In some such embodiments, the low precision hash is based on a luma component on a first set of candidate block positions, and the second stage hash search uses all color components on a pre-selected or reduced set of candidate block positions from the first set of candidate block positions. In some such embodiments, the low precision hash is a 16-bit hash and the high precision hash is a 32-bit hash.

In an exemplary embodiment, an intra block copy search method includes generating an N-candidate list as a list of N candidate BVs in a spatial search stage by comparing a sum of absolute differences (SAD) of only the luma component for those blocks in the search range. The encoder performs a hash-based search by (i) determining a hash value of a current block, (ii) identifying a hash table list as a list of block positions in a hash table that has the same hash value as that of the current block and (iii) updating the N-candidate list with blocks in the hash table list having lower SAD of the luma component than the entries in the N-candidate list. The encoder uses a correlation-based refinement algorithm to the updated N-candidate list and selects a final BV as the entry from the N-candidate list having the highest overall correlation of all color components.

In some such embodiments, the correlation-based refinement algorithm comprises finding the most correlated block in N-candidate list by comparing the correlation between each candidate block and a current block.

In some such embodiments, the correlation of two blocks is the negative of the sum of absolute differences (SAD) of all components. For example, the correlation-based refinement is performed according to the equation Cor(SB, CB)=$-\Sigma_{c=0}^{M} SAD_C(SB, CB)$, where SB is a block from an N-candidate list, and CB is a current block, c is the component index, and M is the number of components.

In some such embodiments, the correlation-based refinement algorithm incorporates a similarity measure based on consideration of three components. In an exemplary embodiment, the similarity measure J(p,q) between pixels p and q is provided by, $$J(p, q) = \frac{\min(L(p), L(q)) + \min(Cb(p), Cb(q)) + \min(Cr(p), Cr(q))}{\max(L(p), L(q)) + \max(Cb(p), Cb(q)) + \max(Cr(p), Cr(q)) + \varepsilon}$$

and the correlation is given by Cor(SB, CB)=$\Sigma_{i=0}^{63}$J (SB (i),CB(i)), where SB(i) is the i-th pixel of block SB, CB(i) is the i-th pixel of block CB, and s is a small constant positive value.

In other such embodiments, the correlation-based refinement algorithm is based on a Hamming distance between two high precision hash values of the block SB and CB. In an example, the high-precision hash is a 32 bit cyclic redundancy check (CRC) hash value generated using luma and chroma pixel values, and the correlation-based refinement algorithm is:

Cor(*SB*,*CB*)=−Hamming(HP_Hash(*SB*),HP_Hash (*CB*)), where HP_Hash is high precision hash based on all color components.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

REFERENCES

[R1] ITU-T Q6/16 and ISO/IEC JCT1/SC29/WG11, "Joint Call for Proposals for Coding of Screen Content", MPEG2014/N14175, January 2014, San Jose, USA.

[$R^2$] J. Chen, Y. Chen, T. Hsieh, R. Joshi, M. Karczewicz, W.-S. Kim, X. Li, C. Pang, W. Pu, K. Rapaka, J. Sole, L. Zhang, F. Zou, "Description of screen content coding technology proposal by Qualcomm", JCTVC-Q0031, March 2014, Valencia, ES.

[R3] C.-C. Chen, T.-S. Chang, R.-L. Liao, C.-W. Kuo, W.-H. Peng, H.-M. Hang, Y.-J. Chang, C.-H. Hung, C.-C. Lin, J.-S. Tu, E.-C. Ke, J.-Y. Kao, C.-L. Lin, F.-D. Jou, F.-C. Chen, "Description of screen content coding technology proposal by NCTU and ITRI International", JCTVC-Q0032, March 2014, Valencia, ES.

[R4] P. Lai, T.-D. Chuang, Y.-C. Sun, X. Xu, J. Ye, S.-T. Hsiang, Y.-W. Chen, K. Zhang, X. Zhang, S. Liu, Y.-W. Huang, S. Lei, "Description of screen content coding technology proposal by MediaTek", JCTVC-Q0033, March 2014, Valencia, ES.

[R5] Z. Ma, W. Wang, M. Xu, X. Wang, H. Yu, "Description of screen content coding technology proposal by Huawei Technologies", JCTVC-Q0034, March 2014, Valencia, ES.

[R6] B. Li, J. Xu, F. Wu, X. Guo, G. J. Sullivan, "Description of screen content coding technology proposal by Microsoft", JCTVC-Q0035, March 2014, Valencia, ES.

[R7] R. Cohen, A. Minezawa, X. Zhang, K. Miyazawa, A. Vetro, S. Sekiguchi, K. Sugimoto, T. Murakami, "Description of screen content coding technology proposal by Mitsubishi Electric Corporation", JCTVC-Q0036, March 2014, Valencia, ES.

[R8] X. Xiu, C.-M. Tsai, Y. He, Y. Ye, "Description of screen content coding technology proposal by InterDigital", JCTVC-Q0037, March 2014, Valencia, ES.

[R9] T. Lin, S. Wang, P. Zhang, and K. Zhou, "AHG8: P2M based dual-coder extension of HEVC", Document no JCTVC-L0303, January 2013.

[R10] X. Guo, B. Li, J.-Z. Xu, Y. Lu, S. Li, and F. Wu, "AHG8: Major-color-based screen content coding", Document no JCTVC-O0182, October 2013.

[R11] L. Guo, M. Karczewicz, J. Sole, and R. Joshi, "Evaluation of Palette Mode Coding on HM-12.0+RExt-4.1", JCTVC-O0218, October 2013.

[R12] C. Pang, J. Sole, L. Guo, M. Karczewicz, and R. Joshi, "Non-RCE3: Intra Motion Compensation with 2-D MVs", JCTVC-N0256, July 2013.

[R13] B. Bross, W-J. Han, G. J. Sullivan, J-R. Ohm, T. Wiegand, "High Efficiency Video Coding (HEVC) Text Specification Draft 10", JCTVC-L1003. January 2013.

[R14] G. J. Sullivan and T. Wiegand, Rate-distortion optimization for video compression. IEEE Signal Processing Magazine, vol. 15, issue 6, November 1998.

[R15] T. Vermeir, "Use cases and requirements for lossless and screen content coding", JCTVC-M0172, April 2013, Incheon, KR.

[R16] J. Sole, R. Joshi, M. Karczewicz, "AhG8: Requirements for wireless display applications", JCTVC-M0315, April 2013, Incheon, KR.

[R17] D. Flynn, M. Naccari, K. Sharman, C. Rosewarne, J. Sole, G. J. Sullivan, T. Suzuki, "HEVC Range Extension Draft 6", JCTVC-P1005, January 2014, San Jose.

[R18] J. Sole, S. Liu, "HEVC Screen Content Coding Core Experiment 1 (SCCE1): Intra Block Copying Extensions", JCTVC-Q1121, March 2014, Valencia.

[R19] C.-C. Chen, X. Xu, L. Zhang, "HEVC Screen Content Coding Core Experiment 2 (SCCE2): Line-based Intra Copy", JCTVC-Q1122, March 2014, Valencia.

[R20] Y.-W. Huang, P. Onno, R. Joshi, R. Cohen, X. Xiu, Z. Ma, "HEVC Screen Content Coding Core Experiment 3 (SCCE3): Palette mode", JCTVC-Q1123, March 2014, Valencia.

[R21] Y. Chen, J. Xu, "HEVC Screen Content Coding Core Experiment 4 (SCCE4): String matching for sample coding", JCTVC-Q1124, March 2014, Valencia.

[R22] X. Xiu, J. Chen, "HEVC Screen Content Coding Core Experiment 5 (SCCE5): Inter-component prediction and adaptive color transforms", JCTVC-Q1125, March 2014, Valencia.

[R23] P. Onno, G. Laroche, T. Poirier, C. Gisquet, "AhGS: On the displacement vector prediction scheme for Intra Block Copy", JCTVC-Q0062, March 2014, Valencia.

[R24] X. Zhang, K. Zhang, J. An, H. Huang, S. Lei, "Block vector prediction for intra block copy", JCTVC-Q0080, March 2014, Valencia.

[R25] K. Zhang, J. An, X. Zhang, H. Huang, S. Lei, "Symmetric intra block copy", JCTVC-Q0082, March 2014, Valencia.

[R26] S.-T. Hsiang, T.-D. Chuang, S. Lei, "AHG8; Coding the prediction differences of the intra BC vectors", JCTVC-Q0095, March 2014, Valencia.

[R27] C. Pang, J. Sole, R. Joshi, M. Karczewicz, "Block vector prediction method for intra block copy", JCTVC-Q0114, March 2014, Valencia.

[R28] L. Zhu, J. Xu, G. J. Sullivan, Y. Wu, S. Sankuratri, B. A. Kumar, "Ping-pong block vector predictor for intra block copy", JCTVC-Q0134, March 2014, Valencia.

[R29] B. Li, J. Xu, "Hash-based intraBC search", JCTVC-Q0252, March 2014, Valencia.

[R30] C. Pang, J. Sole, T. Hsieh, M. Karczewicz, "Intra block copy with larger search region", JCTVC-Q0139, March 2014, Valencia.

[R31] R. Joshi, J. Xu, R. Cohen, S. Liu, Z. Ma, Y. Ye, "Screen content coding test model 1 (SCM 1)", JCTVC-Q1014, March 2014, Valencia.

[R32] C. Pang, J. Sole, M. Karczewicz, "Intra block copy with encoder search using chroma component", JCTVC-Q0175, March 2014, Valencia, ES.

What is claimed is:

1. A method of generating a bit stream encoding a video including an input video block, the method comprising:
identifying a selected set of candidate blocks for prediction of the input video block, where the identification of the selected set includes performing a hash-based search of available video blocks;
for each of the candidate blocks in the selected set, determining a correlation between luma and chroma components of the input video block and luma and chroma components of the respective candidate blocks;
selecting a predictor block based on the correlation; and
encoding the input video block in the bit stream using the selected predictor block for prediction of the input video block.

2. The method of claim 1, wherein the identification of the selected set further includes performing a spatial search of the available video blocks.

3. The method of claim 1, wherein the hash-based search includes a search of blocks having a hash value equal to a hash value of the input video block.

4. The method of claim 3, wherein the hash-based search identifies the selected set of candidate blocks based on a comparison between the luma component of the input video block and the luma component of the respective available video blocks.

5. The method of claim 3, wherein the hash-based search identifies the selected set of candidate blocks based on a sum of absolute differences between luma pixels of the input video block and corresponding luma pixels of the respective available video blocks.

6. The method of claim 1, wherein determining a correlation includes determining a sum of absolute differences between the luma and chroma pixels of the input video block and the corresponding luma and chroma pixels of the respective candidate blocks.

7. The method of claim 6, wherein the correlation is the negative of the sum of absolute differences.

8. The method of claim 1, wherein determining a correlation includes determining a Jaccard similarity measure between corresponding pixels of the input video block and of the respective candidate blocks.

9. The method of claim 1, wherein determining a correlation includes determining a Hamming distance between a high-precision hash value of the input video block and high-precision hash values of the respective candidate blocks.

10. A method of generating a bit stream encoding a video including an input video block, the method comprising:
determining a hash value for the input video block;
identifying a first set of candidate blocks for prediction of the input video block, wherein identifying the first set of candidate blocks includes identifying available video blocks having respective hash values equal to the hash value of the input video block;
from the candidate blocks in the first set, selecting a second set of candidate blocks based on comparison of the luma component of the input video block with the luma component of the respective candidate blocks;
for each of the candidate blocks in the second set, determining a correlation between luma and chroma components of the input video block and luma and chroma components of the respective candidate blocks in the second set;
selecting a predictor block based on the correlation; and
encoding the input video block in the bit stream using the selected predictor block for prediction of the input video block.

11. The method of claim 10, wherein the identification of the first set of candidate blocks includes identifying available video blocks located in a predetermined spatial range.

12. The method of claim 10, wherein the comparison of the luma component of the input video block with the luma component of the respective candidate blocks includes determining, for each of the respective candidate blocks, a sum of absolute differences between the luma pixels of the input video block and the corresponding luma pixels of the respective candidate blocks.

13. The method of claim 12, wherein the second set of candidate blocks includes those of the first set of candidate blocks having the N lowest values of the sum of absolute differences, where N is a predetermined integer greater than or equal to one.

14. The method of claim 10, wherein determining a correlation includes determining a sum of absolute differences between the luma and chroma pixels of the input video block and the corresponding luma and chroma pixels of the respective candidate blocks.

15. The method of claim 10, wherein determining a correlation includes determining a Jaccard similarity measure between corresponding pixels of the input video block and of the respective candidate blocks.

16. The method of claim 11, wherein determining a correlation includes determining a Hamming distance between a high-precision hash value of the input video block and high-precision hash values of the respective candidate blocks.

17. The method of claim 16, wherein the high-precision hash values are cyclic redundancy check values.

18. A video encoder including a processor and a non-transitory computer-readable medium storing instructions operative, when executed on the processor, to perform functions including:
 identifying a selected set of candidate blocks for prediction of the input video block, where the identification of the selected set includes performing a hash-based search;
 for each of the candidate blocks in the selected set, determining a correlation between luma and chroma components of the input video block and luma and chroma components of the respective candidate blocks;
 selecting a predictor block based on the correlation; and
 encoding the input video block in the bit stream using the selected predictor block for prediction of the input video block.

19. The encoder of claim 18, wherein the identification of the selected set further includes performing a spatial search of the available video blocks.

20. The encoder of claim 18, wherein determining a correlation includes determining a sum of absolute differences between the luma and chroma pixels of the input video block and the corresponding luma and chroma pixels of the respective candidate blocks.

* * * * *

UNITED STATES PATENT AND TRADEMARK OFFICE
CERTIFICATE OF CORRECTION

PATENT NO. : 10,897,629 B2
APPLICATION NO. : 14/743662
DATED : January 19, 2021
INVENTOR(S) : Yuwen He et al.

It is certified that error appears in the above-identified patent and that said Letters Patent is hereby corrected as shown below:

In the Claims

Claim 16, Column 25, Line 8: Replace "The method of claim 11," with --The method of claim 10,--

Signed and Sealed this
Seventh Day of February, 2023

Katherine Kelly Vidal
*Director of the United States Patent and Trademark Office*